US007835240B2

(12) United States Patent
Mawatari et al.

(10) Patent No.: US 7,835,240 B2
(45) Date of Patent: Nov. 16, 2010

(54) RECORDING APPARATUS, ABNORMALITY DETECTION METHOD, AND PROGRAM

(75) Inventors: Hideki Mawatari, Tokyo (JP); Kenji Goto, Kanagawa (JP)

(73) Assignee: Sony Corporation (JP)

( * ) Notice: Subject to any disclaimer, the term of this patent is extended or adjusted under 35 U.S.C. 154(b) by 708 days.

(21) Appl. No.: 11/820,254

(22) Filed: Jun. 18, 2007

(65) Prior Publication Data

US 2007/0297304 A1 Dec. 27, 2007

(30) Foreign Application Priority Data

Jun. 22, 2006 (JP) .......................... P2006-172444

(51) Int. Cl.
G11B 27/36 (2006.01)
(52) U.S. Cl. .............. 369/53.12; 369/47.14; 369/47.55; 369/53.31; 369/53.37; 369/53.45
(58) Field of Classification Search .............. 369/47.14, 369/47.55, 53.12, 53.31, 53.37, 53.45
See application file for complete search history.

(56) References Cited

U.S. PATENT DOCUMENTS 7,554,580 B2 * 6/2009 Katayama .............. 348/231.99

2006/0233078 A1 10/2006 Terada et al.

FOREIGN PATENT DOCUMENTS

JP 05028627 A * 2/1993
JP P2005-004912 A 1/2005

* cited by examiner

Primary Examiner—Wayne R Young
Assistant Examiner—Brenda Bernardi
(74) Attorney, Agent, or Firm—Lerner, David, Littenberg, Krumholz & Mentlik, LLP

(57) ABSTRACT

A recording apparatus recording data on an optical disk includes a management information checking unit that determines whether or not management information on the optical disk for managing the data recorded on the optical disk exists by checking for management information on the optical disk when the optical disk is inserted in the recording apparatus; an area usage checking unit that determines whether or not a usage history of an optical disk area for optimizing recording power exists by checking a use condition of the optical disk area for optimizing recording power; and an abnormality detection unit that determines whether or not an optical disk abnormality exists in accordance with the presence or absence of management information on the optical disk and the presence or absence of a usage history of the optical disk area for optimizing recording power.

10 Claims, 12 Drawing Sheets

RECORDING APPARATUS, ABNORMALITY DETECTION METHOD, AND PROGRAM

CROSS-REFERENCE TO RELATED APPLICATIONS

The present application claims priority from Japanese Patent Application No. JP 2006-172444, filed in the Japanese Patent Office on Jun. 22, 2006, the entire content of which is incorporated herein by reference.

BACKGROUND OF THE INVENTION

1. Field of the Invention

The present invention relates to recording apparatuses, abnormality detection methods, and programs, and more particularly, to a recording apparatus, an abnormality detection method, and a program in which, when an optical disk that stores data but that does not store management information on the data due to some reason is reinserted into a drive, the optical disk is prevented from being determined to be an unused medium and thus the user data stored on the optical disk is prevented from being damaged or lost.

2. Description of the Related Art

Recording optical disk drives for recordable compact discs (CDs), recordable digital versatile disks (DVDs), MiniDiscs (MDs), magneto-optical disks (MOs), and the like in the marketplace may fail to record data due to, for example, vibration and shock, cracks and stains, or defects of devices.

If a failure occurs in recording management information indicating a recording condition of data recorded on a disk and no management information is recorded, the data exists but no management information exists in the disk.

In an optical disk drive of the related art, when a disk is inserted, the optical disk drive determines whether or not management information exists. If it is determined that no management information exists, the inserted disk is determined to be an unused disk (see Japanese Unexamined Patent Application Publication No. 2005-222665).

SUMMARY OF THE INVENTION

When a disk in which management information has been failed to be recorded is inserted in an optical disk drive of the related art, overwriting may be performed on a portion in which data has already been recorded. Thus, the recorded data may be damaged or lost.

In addition, if such an optical disk is of a write-once type, data to be newly recorded may also be damaged. In particular, if data is recorded in a video camera or a digital camera in which recorded data is rarely backed up, data that is important to a user may be lost.

Thus, it is desirable that, when an optical disk that stores data but that does not store management information on the data due to some reason is reinserted into a drive, the optical disk is prevented from being determined to be an unused medium and thus the user data stored on the optical disk is prevented from being damaged or lost.

A recording apparatus according to an embodiment of the present invention that records data on an optical disk includes management information checking means for determining whether or not management information on the optical disk for managing the data recorded on the optical disk exists by checking for management information on the optical disk when the optical disk is inserted in the recording apparatus; area usage checking means for determining whether or not a usage history of an optical disk area for optimizing recording power exists by checking a use condition of the optical disk area for optimizing recording power; and abnormality detecting means for determining whether or not an optical disk abnormality exists in accordance with the presence or absence of management information on the optical disk and the presence or absence of a usage history of the optical disk area for optimizing recording power.

When no management information on the optical disk exists and a usage history of the optical disk area for optimizing recording power exists, the abnormality detecting means may determine that an optical disk abnormality exists.

The recording apparatus may further include storing means for storing information indicating the presence or absence of management information on the optical disk, information indicating the presence or absence of a usage history of the optical disk area for optimizing recording power, and information indicating the use condition of the optical disk area for optimizing recording power.

When management information on the optical disk exists, the abnormality detecting means may determine whether or not an optical disk abnormality exists in accordance with determination of whether or not a use condition of the optical disk area for optimizing recording power described in the management information on the optical disk is the same as the use condition of the optical disk area for optimizing recording power checked by the area usage checking means.

The recording apparatus may further include data area checking means for determining whether or not a data recording area of the optical disk has been used by checking a use condition of the data recording area of the optical disk. The abnormality detecting means may determine whether or not an optical disk abnormality exists not only in accordance with the presence or absence of management information on the optical disk and the presence or absence of a usage history of the optical disk area for optimizing recording power but also in accordance with a result of the determination of whether or not the data recording area of the optical disk has been used.

When management information on the optical disk exists, the abnormality detecting means may determine whether or not an optical disk abnormality exists in accordance with determination of whether or not a use condition of the data recording area described in the management information on the optical disk is the same as the use condition of the data recording area of the optical disk checked by the data area checking means.

The recording apparatus may further include informing means for informing a user of an optical disk abnormality in the case that the abnormality detecting means determines that an optical disk abnormality exists.

An abnormality detection method according to an embodiment of the present invention for use in a recording apparatus recording data on an optical disk includes the steps of determining whether or not management information on the optical disk for managing the data recorded on the optical disk exists by checking for management information on the optical disk when the optical disk is inserted in the recording apparatus; determining whether or not a usage history of an optical disk area for optimizing recording power exists by checking a use condition of the optical disk area for optimizing recording power; and determining whether or not an optical disk abnormality exists in accordance with the presence or absence of management information on the optical disk and the presence or absence of a usage history of the optical disk area for optimizing recording power.

A program according to an embodiment of the present invention causes a recording apparatus recording data on an optical disk to execute processing including the steps of determining whether or not management information on the optical disk for managing the data recorded on the optical disk exists by checking for management information on the optical disk when the optical disk is inserted in the recording apparatus; determining whether or not a usage history of an optical disk area for optimizing recording power exists by checking a use condition of the optical disk area for optimizing recording power; and determining whether or not an optical disk abnormality exists in accordance with the presence or absence of management information on the optical disk and the presence or absence of a usage history of the optical disk area for optimizing recording power.

As described above, when an optical disk is inserted, it is determined whether or not management information on the optical disk for managing data recorded on the optical disk exists by checking for management information on the optical disk, and it is determined whether or not a usage history of an optical disk area for optimizing recording power exists by checking a use condition of the optical disk area for optimizing recording power. Then, in accordance with the presence or absence of management information on the optical disk and the presence or absence of a usage history of the optical disk area for optimizing recording power, it is determined whether or not an optical disk abnormality exists.

Accordingly, data previously recorded by a user or data to be recorded can be prevented from being lost.

DESCRIPTION OF THE PREFERRED EMBODIMENTS

Before describing preferred embodiments of the present invention, the correspondence between the features of the present invention and embodiments described in the description of the preferred embodiments or the drawings will be discussed below. This description is intended to assure that embodiments supporting the invention are described in the description of the preferred embodiments or the drawings. Thus, even if an embodiment described in the description of the preferred embodiments or the drawings is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

Figure 3:
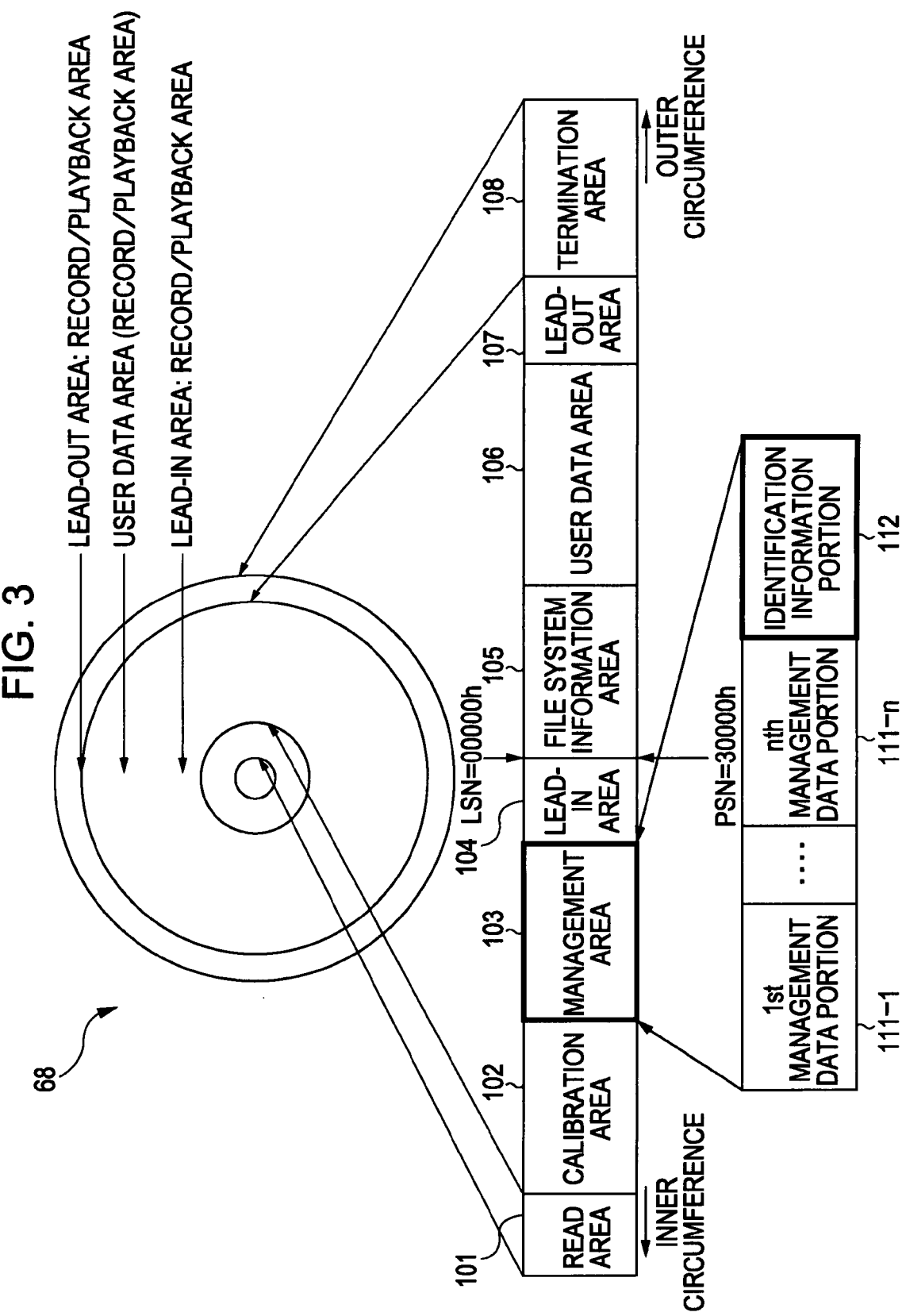
FIG. 3 is an illustration for explaining the format of an optical disk shown in FIG. 2.
Figure 4:
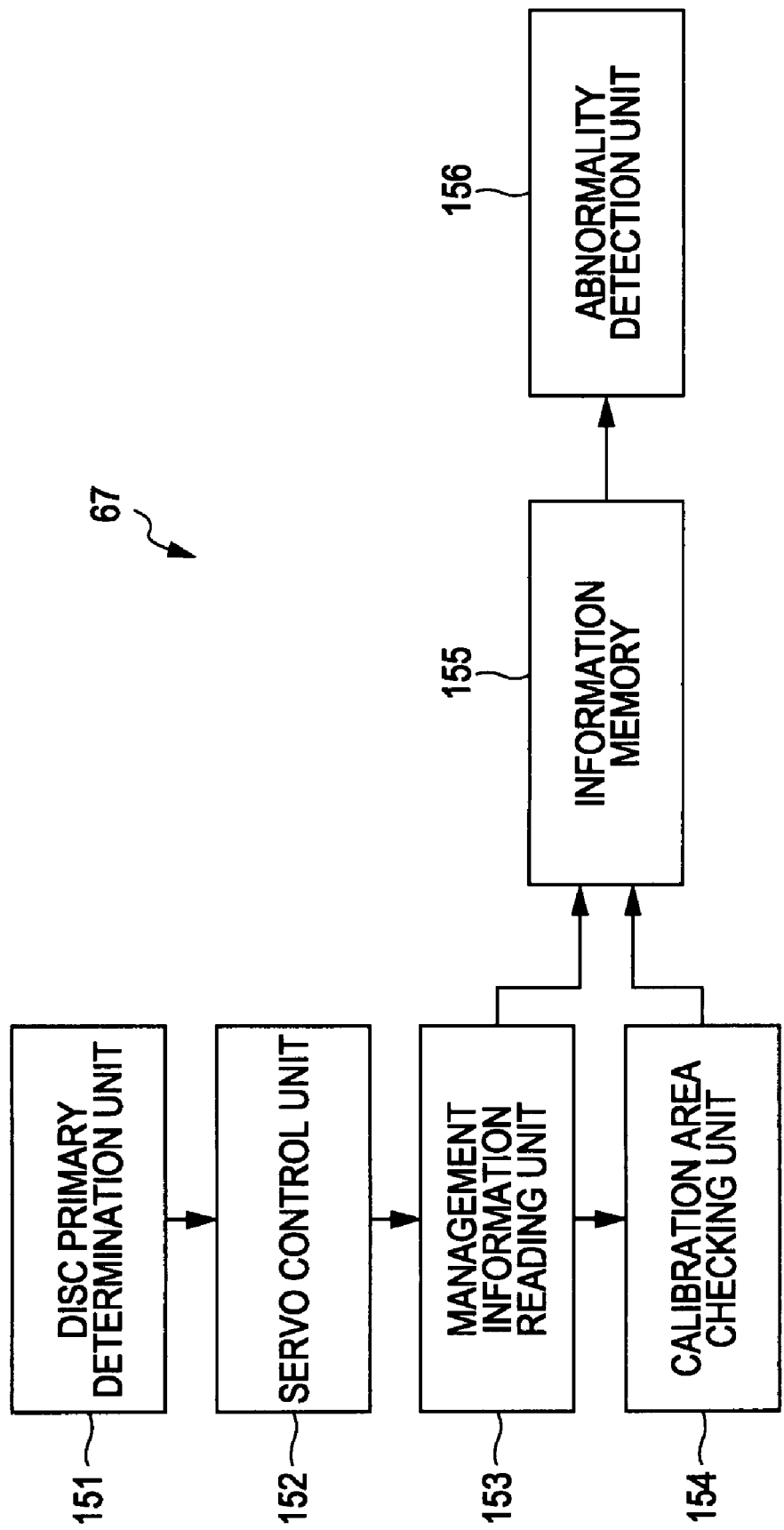
FIG. 4 is a block diagram showing an example of the configuration of functions of a controller shown in FIG. 2.

A recording apparatus (for example, a video camera 1 shown in FIG. 1) according to an embodiment of the present invention that records data on an optical disk (for example, an optical disk 68 shown in FIG. 2) includes management information checking means (for example, a management information reading unit 153 shown in FIG. 4) for determining whether or not management information on the optical disk for managing the data recorded on the optical disk exists by checking for management information on the optical disk when the optical disk is inserted in the recording apparatus; area usage checking means (for example, a calibration area checking unit 154 shown in FIG. 4) for determining whether or not a usage history of an optical disk area for optimizing recording power (for example, a power calibration area 102 shown in FIG. 3) exists by checking a use condition of the optical disk area for optimizing recording power; and abnormality detecting means (for example, an abnormality detection unit 156 shown in FIG. 4) for determining whether or not an optical disk abnormality exists in accordance with the presence or absence of management information on the optical disk and the presence or absence of a usage history of the optical disk area for optimizing recording power.

The recording apparatus may further include storing means (for example, an information memory 155 shown in FIG. 4) for storing information indicating the presence or absence of management information on the optical disk, information indicating the presence or absence of a usage history of the optical disk area for optimizing recording power, and information indicating the use condition of the optical disk area for optimizing recording power.

The recording apparatus may further include data area checking means (for example, a data area checking unit 171 shown in FIG. 9) for determining whether or not a data recording area of the optical disk has been used by checking a use condition of the data recording area. The abnormality detecting means may determine whether or not an optical disk abnormality exists not only in accordance with the presence or absence of management information on the optical disk and the presence or absence of a usage history of the optical disk area for optimizing recording power but also in accordance with a result of the determination of whether or not the data recording area of the optical disk has been used.

The recording apparatus may further include informing means (for example, an LCD 16 or an output unit 28 shown in FIG. 1) for informing a user of an optical disk abnormality in the case that the abnormality detecting means determines that an optical disk abnormality exists.

An abnormality detection method or a program according to an embodiment of the present invention for use in a recording apparatus recording data on an optical disk includes the steps of determining (for example, step S13 shown in FIG. 5) whether or not management information on the optical disk for managing the data recorded on the optical disk exists by checking for management information on the optical disk when the optical disk is inserted in the recording apparatus; determining (for example, step S14 shown in FIG. 5) whether or not a usage history of an optical disk area for optimizing recording power exists by checking a use condition of the optical disk area for optimizing recording power; and determining (for example, step S15 shown in FIG. 5) whether or not an optical disk abnormality exists in accordance with the presence or absence of management information on the optical disk and the presence or absence of a usage history of the optical disk area for optimizing recording power.

The present invention relates to a recording apparatus that records data in an optical disk. The recording apparatus is for example, a video camera, a digital still camera, a personal computer a portable DVD player, a DVD recorder, or the like that uses an optical disk as a recording medium.

Embodiments of the present invention will be described with reference to the drawings.

Figure 1:
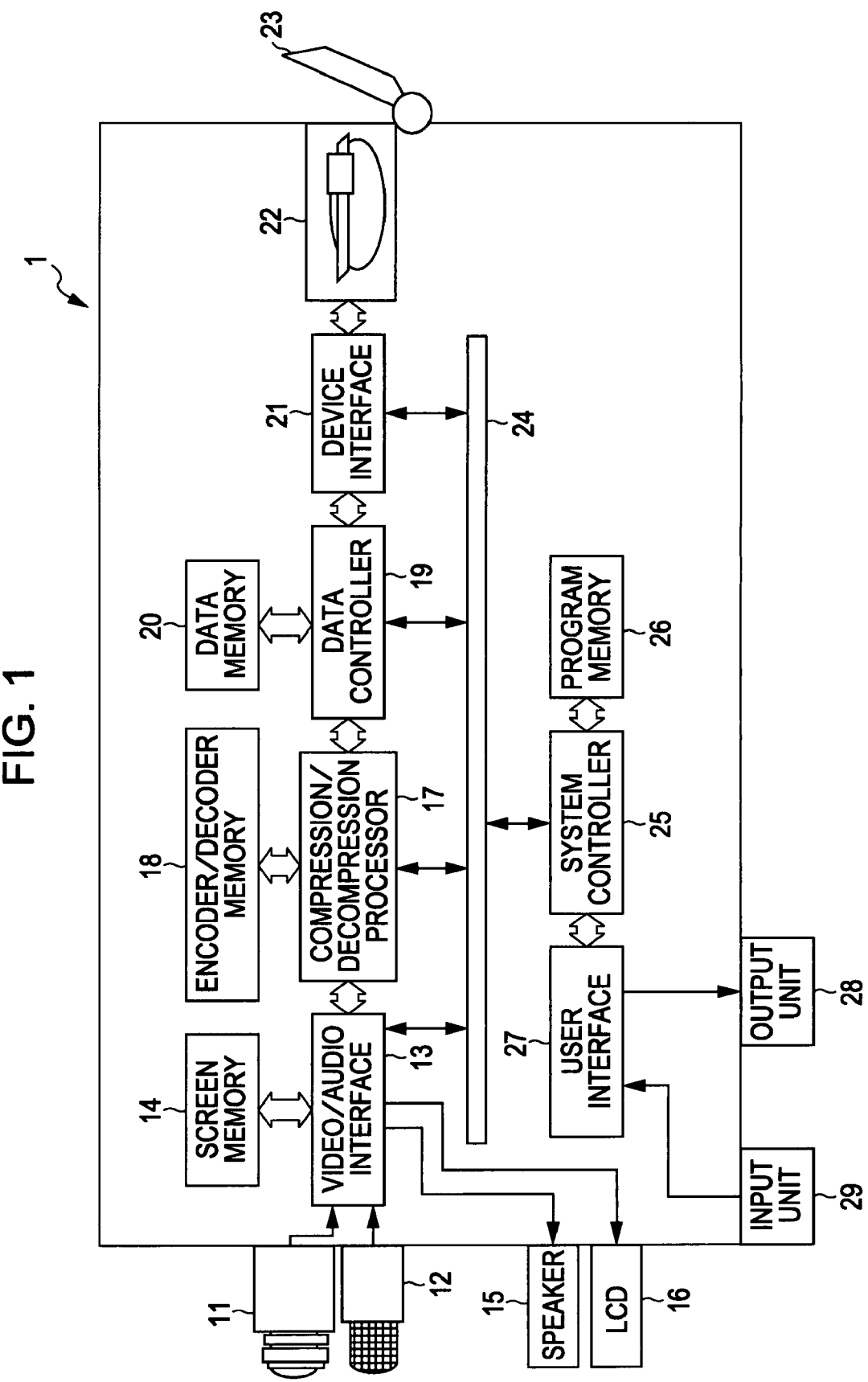
FIG. 1 is a block diagram showing an example of the configuration of a video camera according to an embodiment of the present invention.

FIG. 1 is a block diagram showing an example of the configuration of a video camera according to an embodiment of the present invention.

A video camera 1 includes an imaging unit 11, a microphone 12, a video/audio interface 13, a screen memory 14, a speaker 15, a liquid crystal display (LCD) 16, a compression/decompression processor 17, an encoder/decoder memory 18, a data controller 19, a data memory 20, a device interface 21, an optical disk drive 22, a cover 23, a system control bus 24, a system controller 25, a program memory 26, a user interface 27, an output unit 28, and an input unit 29.

The video/audio interface 13, the compression/decompression processor 17, the data controller 19, the device interface 21, and the system controller 25 are connected to each other with the system control bus 24 therebetween.

The imaging unit 11 includes, for example, a lens, a charge-coupled device (CCD) imaging element, and the like. The imaging unit 11 captures an image of a subject under the control of the system controller 25, and supplies the obtained image data to the compression/decompression processor 17 via the video/audio interface 13. The microphone 12 collects sound around the microphone 12 under the control of the system controller 25, and converts an audio signal, which is an obtained analog signal, into audio data, which is a digital signal, by a built-in analog-to-digital (A/D) converter. The microphone 12 supplies the audio data, which is obtained by converting the audio signal into the digital signal, to the compression/decompression processor 17 via the video/audio interface 13.

The video/audio interface 13 supplies to the compression/decompression processor 17 image data received from the imaging unit 11 or audio data received from the microphone 12. In addition, the video/audio interface 13 supplies to the speaker 15 audio data received from the compression/decompression processor 17 and supplies to the LCD 16 image data received from the compression/decompression processor 17 or the system controller 25.

The screen memory 14 includes, for example, a nonvolatile semiconductor memory. The screen memory 14 records data for displaying a character or drawing (image) of an icon or the like. In addition, the screen memory 14 supplies via the video/audio interface 13 to the system controller 25 the recorded data for displaying the character or drawing (image) of the icon or the like. The video camera 1 may not include the screen memory 14.

The speaker 15 outputs sound in accordance with audio data received from the video/audio interface 13. The LCD 16 displays an image in accordance with image data received from the video/audio interface 13.

When, for example, differential compression between frames of an image signal or between fields of an image signal is performed, the compression/decompression processor 17 supplies, where appropriate, to the encoder/decoder memory 18 image data or audio data received from the video/audio interface 13, and causes the encoder/decoder memory 18 to temporarily store the image data or the audio data. The compression/decompression processor 17 encodes, in accordance with an encoding method, such as Joint Photographic Experts Group (JPEG), Moving Picture Experts Group 1 (MPEG1), MPEG2, or MPEG4, image data received from the video/audio interface 13 or image data stored in the encoder/decoder memory 18. The compression/decompression processor 17 supplies the encoded image data to the data controller 19. The image data is not necessarily encoded in accordance with the above-mentioned encoding method. The image data may be encoded in accordance with an encoding method that complies with a compression/decompression format of a future moving or static image.

In addition, the compression/decompression processor 17 encodes, in accordance with an encoding method, such as MPEG 1, MPEG2, or MPEG4, audio data received from the video/audio interface 13 or audio data stored in the encoder/decoder memory 18. The compression/decompression processor 17 supplies the encoded audio data to the data controller 19.

In addition, the compression/decompression processor 17 decodes, in accordance with a decoding method corresponding to the encoding method, such as MPEG1, MPEG2, MPEG4, or JPEG, image data or audio data received from the data controller 19. The compression/decompression processor 17 supplies the decoded image data or audio data to the video/audio interface 13.

The encoder/decoder memory 18 includes, for example, a volatile semiconductor memory. The encoder/decoder memory 18 temporarily stores image data or audio data received from the compression/decompression processor 17. In addition, the encoder/decoder memory 18 supplies stored image data or audio data to the compression/decompression processor 17.

The data controller 19 supplies, where appropriate, to the data memory 20 image data received from the compression/decompression processor 17, and causes the data memory 20 to temporarily store the image data. The data controller 19 supplies via the device interface 21 to the optical disk drive 22 or via the system control bus 24 to the system controller 25 the image data or the audio data received from the compression/decompression processor 17.

In addition, the data controller 19 supplies via the device interface 21 to the optical disk drive 22 image data or audio data stored in the data memory 20. In addition, the data controller 19 supplies to the compression/decompression processor 17 image data received from the system controller 25. In addition, the data controller 19 supplies to the system controller 25 an abnormality information signal received via the device interface 21 from the optical disk drive 22. The abnormality information signal indicates that the optical disk may be abnormal.

The data memory 20 includes, for example, a volatile semiconductor memory. The data memory 20 temporarily stores image data or audio data received from the data controller 19, and arranges the image data or the audio data in a first-in-first-out (FIFO) queue. The data memory 20 supplies to the data controller 19 the stored image data or audio data in an order of the sequence of the FIFO queue.

The device interface 21 performs nonconsecutive handshaking in accordance with a standard, such as ATA/ATAPI-4 (AT Attachment Packet Interface), SCSI (Small Computer System Interface), USB (Universal Serial Bus), IEEE (Institute of Electrical and Electronic Engineers) 1394, or the like.

Accordingly, the device interface 21 exchanges (transfers) various data with the optical disk drive 22.

That is, the device interface 21 transfers (supplies) to the optical disk drive 22 image data or audio data received from the data controller 19 or various signals received from the system controller 25. In addition, the device interface 21 receives image data or audio data read from an optical disk inserted in the optical disk drive 22 or an abnormality information signal for the optical disk received from the optical disk drive 22, and supplies the image data or audio data or the abnormality information signal to the data controller 19.

When a user opens the cover 23, an optical disk, such as a compact disk recordable (CD-R), a compact disk rewritable (CD-RW), a digital versatile disk recordable (DVD-R), a digital versatile disk rewritable (DVD-RW), a DVD+R, a DVD+RW, a digital versatile disk random access memory (DVD-RAM), or the like can be inserted in or removed from the optical disk drive 22. In addition, the optical disk may be a Blu-ray disc or a high-definition DVD (HD-DVD), which has a relatively larger recording capacity.

When an optical disk is inserted in the optical disk drive 22, the optical disk drive 22 determines whether or not an optical disk abnormality exists in accordance with the presence or absence of management information, which is recorded on the optical disk for managing data recorded on the optical disk, and in accordance with the presence or absence of a usage history of a power calibration area, which is provided in the optical disk for optimizing recording power of a laser diode. If it is determined that the optical disk is abnormal, the optical disk drive 22 supplies, in order to inform a user that the optical disk is abnormal, an abnormality information signal for the optical disk to the device interface 21.

If it is determined that the optical disk is not abnormal, the optical disk drive 22 reads image data or audio data recorded on the disk, where appropriate, and supplies the read image data or audio data to the device interface 21. In addition, the optical disk drive 22 optimizes the recording power of the laser diode in an unrecorded portion of the power calibration area, and records on the optical disk the image data or audio data received from the device interface 21. Then, before the optical disk is removed, the optical disk drive 22 updates management information for the newly recorded data.

The system controller 25 executes a program recorded in the program memory 26. The system controller 25 performs various types of processing by controlling the video/audio interface 13, the compression/decompression processor 17, the data controller 19, the device interface 21, and the like, that are connected with each other with the system control bus 24 therebetween. In addition, the system controller 25 performs processing in accordance with an input signal received from the input unit 29, which is connected to the system controller 25 with the user interface 27 therebetween.

In addition, in accordance with an input signal received from the input unit 29 or an abnormality information signal for the optical disk received from the data controller 19, the system controller 25 controls the output unit 28, which includes a light-emitting element, an acoustic element, and the like to generate light or sound for informing the user of the condition of the video camera 1 and possibility of the existence of an optical disk abnormality. In addition, the system controller 25 reads, where appropriate, data recorded on the screen memory 14 for displaying a character or drawing (image) of an icon or the like, and performs predetermined calculation on the basis of the read data. The system controller 25 supplies via the video/audio interface 13 to the LCD 16 the obtained image data for displaying the character or drawing (image) of the icon or the like.

The program memory 26 includes, for example, a nonvolatile semiconductor memory. The program memory 26 functions as a program-storing memory for the system controller 25 or as a work memory. A program for causing the system controller 25 to execute various types of processing is recorded in the program memory 26.

The output unit 28 and the input unit 29 are connected to the system controller 25 with the user interface 27 therebetween. The output unit 28 includes, for example, the light-emitting element, the acoustic element, and the like. The output unit 28 generates, under the control of the system controller 25, light or sound for informing the user of the condition of the video camera 1 and possibility of the existence of an optical disk abnormality.

The input unit 29 includes, for example, a key input button, a switch, a touch panel, and the like. The input unit 29 generates an input signal in accordance with a user operation, and supplies the generated input signal to the system controller 25 via the user interface 27.

Figure 2:
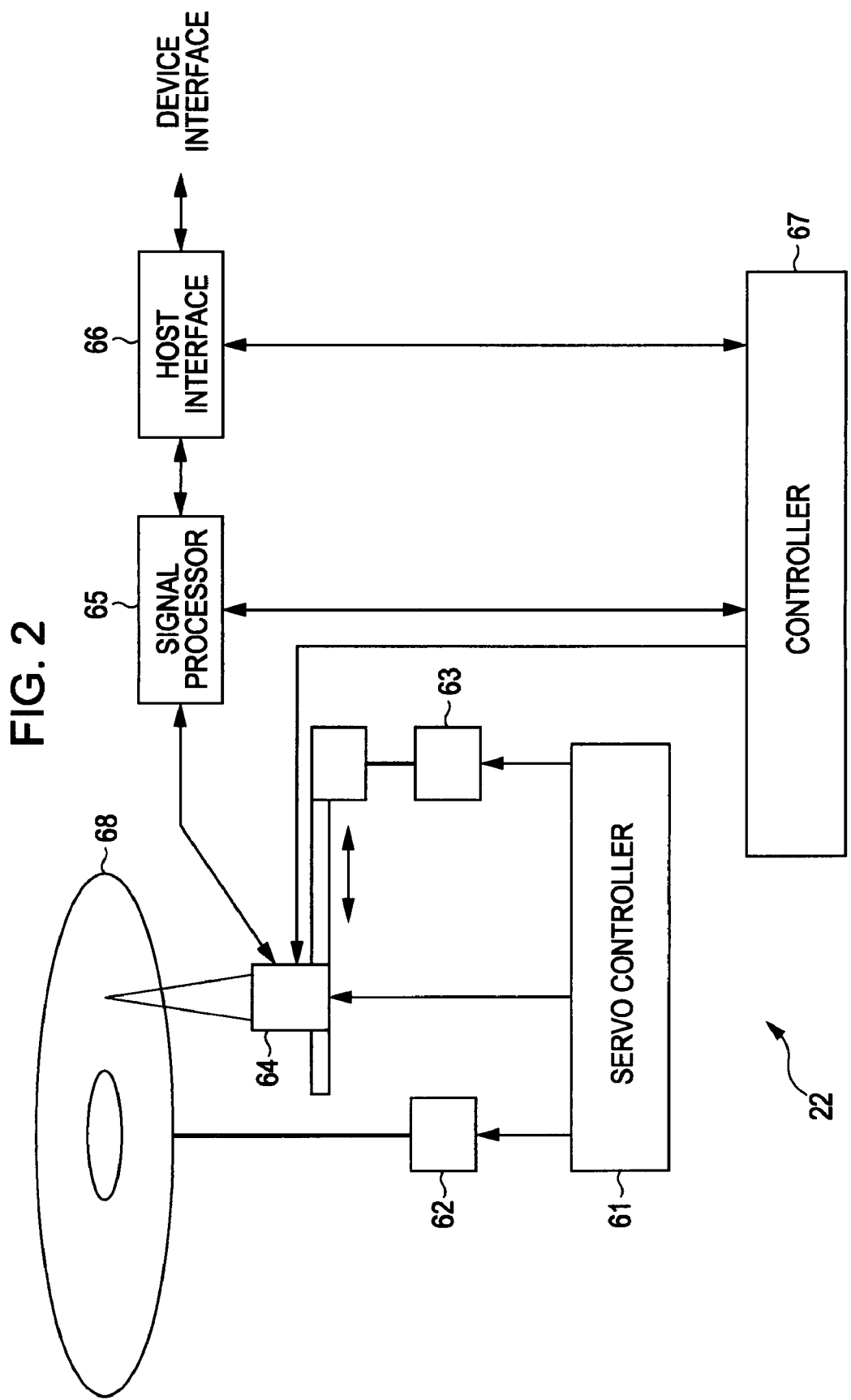
FIG. 2 is a block diagram showing an example of the configuration of an optical disk drive shown in FIG. 1.

FIG. 2 is a block diagram showing a configuration of the optical disk drive 22 shown in FIG. 1.

The optical disk drive 22 includes a servo controller 61, a spindle motor 62, a sled motor 63, an optical pickup 64, a signal processor 65, a host interface 66, and a controller 67.

The servo controller 61 rotates a shaft of the spindle motor 62 under the control of the controller 67. In addition, the servo controller 61 rotates and drives the sled motor 63 under the control of the controller 67 so as to move the optical pickup 64 in radial directions of an optical disk 68 (that is, horizontal directions in FIG. 2). In addition, the servo controller 61 drives the optical pickup 64 under the control of the controller 67, and adjusts the position of an objective lens (not shown) of the optical pickup 64.

When the optical disk 68, such as a CD-R or a DVD-R, is engaged with (that is, connected to) the shaft of the spindle motor 62 by a clamping mechanism (not shown), the spindle motor 62 rotates and drives, under the control of the servo controller 61, the optical disk 68 connected to the shaft.

The sled motor 63 is rotated and driven under the control of the servo controller 61, and moves the sled connected via a driving power transmission member, such as a gear. Thus, the sled motor 63 moves the optical pickup 64, which is placed on the sled so as to face an information recording plane of the optical disk 68, in the radial directions of the optical disk 68.

The optical pickup 64 is driven under the control of the servo controller 61. The optical pickup 64 is subjected to tracking control and focus control. For example, the optical pickup 64 is subjected to tracking control by the servo controller 61 such that the spot of light radiated from the optical pickup 64 to the optical disk 68 follows a track of the optical disk 68. In addition, for example, the optical pickup 64 is subjected to focus control by the servo controller 61 such that the spot of light radiated from the optical pickup 64 to the optical disk 68 is focused on a recording layer of the optical disk 68.

In addition, under the control of the controller 67, the optical pickup 64 causes the built-in laser diode to emit light in accordance with a recording signal, which is received from the signal processor 65, corresponding to data to be recorded on the optical disk 68. The optical pickup 64 irradiates the optical disk 68 with the light via the objective lens, and records the data on the optical disk 68.

In addition, under the control of the controller 67, the optical pickup 64 irradiates the optical disk 68 with the light, and receives light reflected by the optical disk 68. Then, the optical pickup 64 converts the received light into an electric signal indicating the intensity of the received light. The optical pickup 64 supplies the obtained electric signal to the signal processor 65.

The signal processor 65 performs modulation processing based on, for example, eight-to-fourteen modulation (EFM), on data received from the data controller 19 (see FIG. 1) via the host interface 66 or data received from the controller 67. Then, the signal processor 65 supplies the obtained recording signal to the optical pickup 64.

The signal processor 65 performs, for example, radio frequency (RF) signal processing, binarization, phase lock loop (PLL) synchronous processing, EFM demodulation, or the like on an electric signal received from the optical pickup 64, and extracts data record on the optical disk 68, a focus error signal, a tracking error signal, or a wobble signal from the electric signal.

The signal processor 65 supplies the extracted data to the controller 67 or via the host interface 66 to the data controller 19. In addition, the signal processor 65 supplies the extracted focus error signal, tracking signal, or wobble signal to the controller 67.

In addition, the signal processor 65 has a function to determine whether or not recording has been performed in each area of the optical disk 68. The signal processor 65 binarizes the result of the determination, and supplies the binary data to the controller 67.

In accordance with a standard, such as ATA/ATAPI-4, the host interface 66 supplies via the device interface 21 to the data controller 19 data or various signals received from the signal processor 65 or the controller 67. In addition, the host interface 66 supplies to the signal processor 65 or the controller 67 data received via the device interface 21 from the data controller 19. In addition, the host interface 66 supplies to the controller 67 a predetermined signal received via the device interface 21 from the data controller 19.

The controller 67 includes, for example, a general-purpose central processor, a microprocessor, or a dedicated controller. The controller 67 generally controls the entire optical disk drive 22. For example, the controller 67 controls the optical pickup 64 to irradiate the optical disk 68 with laser light. In addition, the controller 67 supplies, where appropriate, to the host interface 66 data received from the signal processor 65, and supplies, where appropriate, to the signal processor 65 data received from the host interface 66.

The controller 67 determines the format (hereinafter, may be referred to as disk type) of the optical disk 68 inserted (mounted) in the optical disk drive 22 in accordance with a focus error signal supplied from the signal processor 65. In addition, in accordance with a focus error signal, a tracking error signal, or a wobble signal supplied from the signal processor 65, the controller 67 controls the servo controller 61 to perform focus control or tracking control.

In addition, the controller 67 determines whether or not management information for managing data recorded on the optical disk 68 exists in the optical disk 68 by checking for and reading management information. In addition, the controller 67 determines whether or not a usage history of the power calibration area provided in the optical disk for optimizing the recording power of the laser diode exists by checking a use condition of the power calibration area using the function of the signal processor 65 to determine whether or not recording has been performed in each area of the optical disk 68.

Then, the controller 67 determines whether or not the optical disk 68 is abnormal in accordance with the presence or absence of disk management information on the optical disk 68 and the presence or absence of a usage history of the power calibration area. If it is determined that the optical disk 68 is abnormal, the controller 67 generates, in order to inform the user of the determination result, an abnormality information signal indicating that the optical disk 68 may be abnormal, and supplies the abnormality information signal via the host interface 66 to the data controller 19.

The abnormality information signal is supplied via the data controller 19 to the system controller 25. Then, the system controller 25 causes the LCD 16 or the light-emitting element, the acoustic element, or the like of the output unit 28 to output a message indicating that the optical disk 68 is abnormal and a message urging the user to remove the optical disk 68.

FIG. 3 illustrates an example of the format of the optical disk 68. FIG. 3 includes an outline plan view of the optical disk 68, which is a DVD-R, and an illustration for explaining the physical recording format of the DVD-R from the innermost circumference to outermost circumference of the optical disk 68 from left to right. Although a case of a DVD-R is shown FIG. 3, each of a DVD+R, a DVD-RW, and a DVD+RW is configured similarly.

The optical disk 68 includes, from the innermost circumference to the outermost circumference, a read area 101, a power calibration area (calibration area) 102, a management area 103, a lead-in area 104, a file system information area 105, a user data area 106, a lead-out area 107, and a termination area 108.

The read area 101 is an area from which reading of data recorded on the optical disk 68 starts. A power calibration area 102 is an area in which test recording for a beam intensity is performed in order to determine optimal laser power when recording is performed on the optical disk 68, that is, an area for optimizing laser power. Thus, if no data has been recorded, the power calibration area 102 is unused. In addition, when a DVD-R is used, a portion of the power calibration area 102 is used in order from an outer circumference side every time an instruction for recording data is issued.

The management area 103 is an area in which management information on the optical disk 68 is recorded. The management area 103 includes 1st to nth management data portions 111-1 to 111-n and an identification information portion 112. More specifically, in the 1st to nth management data portions 111-1 to 111-n, data management information for managing arrangement of data and recording conditions of the file system information area 105 and the user data area 106 is recorded.

For example, when no data is recorded in the file system information area 105 or the user data area 106, nothing is recorded in the 1st to nth management data portions 111-1 to 111-n. Thus, no data management information exists. However, when data is recorded in the file system information area 105 or the user data area 106, every time immediately before optical disk 68 is removed, data management information for managing the arrangement of the recorded data and a recording condition is recorded in order from an inner circumference side. At the same time, as part of the data management information, information indicating a use condition of the power calibration area, which is used every time data is recorded, (for example, an address representing a use area) is also recorded.

In the identification information portion (that is, a physical format area (PFI area)) 112, information indicating the disk type of the optical disk 68 is recorded in advance by a manufacturer of the optical disk 68. Thus, physical overwriting is not allowed in the identification information portion 112.

In the lead-in area 104, a logical sector number (LSN) starts from 00000h, and a physical sector number (PSN) starts from 30000h. The lead-in area 104 is an area of an introduction to the file system information area 105 and the user data area 106, which are data record/playback areas for the optical disk 68.

The file system information area 105 is an area in which management information on an image file or an audio file recorded in the user data area 106 is recorded. The user data area 106 is an area in which the image data or the audio data is recorded as an image file or an audio file.

The lead-out area 107 is an extra area provided so that all the data recorded in the user data area 106 can be read and the optical pickup 64 and the like are prevented from being moved outside the circumference. The termination area 108 is an area indicating termination of the optical disk 68.

FIG. 4 is a block diagram showing a configuration of functions of the controller 67.

The controller 67 includes a disk primary determination unit 151, a servo control unit 152, a management information reading unit 153, a calibration area checking unit 154, an information memory 155, and an abnormality detection unit 156.

When the optical disk 68 is inserted in the optical disk drive 22, the disk primary determination unit 151 physically determines the disk type of the optical disk 68. For example, the disk primary determination unit 151 irradiates the optical disk 68 with light and receives light reflected by the optical disk 68 while moving the objective lens of the optical pickup 64 in directions perpendicular to the information recording plane of the optical disk 68 (that is, a direction in which the optical pickup 64 approaches the optical disk 68 and a direction in which the optical pickup 64 recedes from the optical disk 68). Accordingly, the disk primary determination unit 151 determines the disk type (for example, a CD-R, a CD-RW, a DVD-R, a DVD-RW, a DVD+R, a DVD+RW, or a DVD-RAM) of the optical disk 68 inserted in the optical disk drive 22 in accordance with a focus error signal obtained from the signal processor 65.

For example, since a DVD-R and a DVD-RW have reflection factors that are greatly different from each other, a disk type can be determined in accordance with the difference in the reflection factors. In addition, since a signal in a track portion is different between a DVD-R and a DVD+R, a disk type can be determined in accordance with the difference in the signals. Accordingly, the disk type of the optical disk 68 can be determined physically.

On the basis of the disk type determined by the disk primary determination unit 151, the servo control unit 152 performs servo control in accordance with a focus error signal, a tracking signal, and the like received from the signal processor 65. The servo control unit 152 controls the servo controller 61 to perform focus control and tracking control.

After servo control is completed, the management information reading unit 153 controls the servo controller 61 and the optical pickup 64 to perform a seek operation for the management area of the optical disk 68. The management information reading unit 153 reads data recorded in the management area, that is, management information. The management information reading unit 153 performs secondary determination as to the disk type of the optical disk 68 in accordance with the management information received from the signal processor 65, and checks a recording condition of the data. At this time, the management information reading unit 153 causes the information memory 155 to store the presence or absence of management information in the optical disk 68.

That is, the management information reading unit 153 performs secondary determination as to the disk type of the optical disk 68 in accordance with information on the disk type of the optical disk 68 stored in advance in the management information portion of the management area, and determines whether or not the result of the secondary determination is the same as the result of the primary determination as to the disk type performed by the disk primary determination unit 151.

In addition, the management information reading unit 153 determines whether or not management information on the optical disk 68 exists by referring to the 1st to nth management data portions 111-1 to **111-*n* of the optical disk 68 to determine a recording condition of the data. For example, if no data is recorded in the 1st to nth management data portions 111-1 to 111-*n*, the management information reading unit 153 determines that no management information on the optical disk 68 exists (more specifically, no data management information exists), and causes the information memory 155 to store a flag indicating that no management information exists. If data is recorded in the 1st to nth management data portions 111-1 to 111-*n*, the management information reading unit 153 determines that management information on the optical disk 68 exists, and causes the information memory 155 to store a flag indicating that management information exists. At this time, as part of the management information, information on a use condition of the power calibration area that is used every time data is recorded, a use condition of the data area, and the like is also stored in the information memory 155**, where appropriate.

The calibration area checking unit 154 controls the servo controller 61 and the optical pickup 64 to perform a seek operation for the power calibration area of the optical disk 68, and causes the signal processor 65 to detect whether or not recording has been performed in the power calibration area. Accordingly, the calibration area checking unit 154 determines whether or not a usage history of the power calibration area exists.

That is, when the signal processor 65 detects whether or not recording has been preformed in the power calibration area, the signal processor 65 binarizes the detection result and supplies the binary data to the calibration area checking unit 154. Thus, the calibration area checking unit 154 determines whether or not a usage history of the power calibration area exists by determining the current use condition in the power calibration area in accordance with the binary data received from the signal processor 65, and causes the information memory 155 to store a flag indicating the presence or absence of a usage history of the power calibration area. At this time, information indicating the determined current use condition in the power calibration area (that is, an address indicating a use area of the power calibration area that is being used) is also stored in the information memory 155.

The information memory 155 includes a RAM, a nonvolatile memory, and the like. A flag indicating the presence or absence of management information, information on a use condition of the power calibration area and a use condition of the data area that are described in the management information, a flag indicating the presence or absence of a usage history of the power calibration area, the current use condition of the power calibration area, and the like are stored in the information memory 155.

The abnormality detection unit 156 determines whether or not the optical disk 68 is abnormal in accordance with information stored in the information memory 155 (that is, at least the flag indicating the presence or absence of management information and the flag indicating the presence or absence of a usage history of the power calibration area).

For example, if management information exists in the optical disk 68, the abnormality detection unit 156 determines that data is recorded in the optical disk 68. Thus, the abnormality detection unit 156 determines that the optical disk 68 is a "used" disk. If neither management information nor usage history of the power calibration area exists in the optical disk 68, the abnormality detection unit 156 determines that no data is recorded on the optical disk 68 (that is, the optical disk 68 is unused). Thus, the abnormality detection unit 156 determines that the optical disk 68 is an "unused" disk. In contrast, if a usage history of the power calibration area exists even though no management information exists in the optical disk 68, the abnormality detection unit 156 determines that the optical disk 68 is very likely to be a disk in which data is recorded but management information is failed to be recorded. Thus, the abnormality detection unit 156 determines that the optical disk 68 is an "abnormal" disk. Then, the abnormality detection unit 156 generates an abnormality information signal indicating that the optical disk 68 is very likely to be abnormal, and supplies the generated abnormality information signal via the host interface 66 to the data controller 19.

Figure 5:
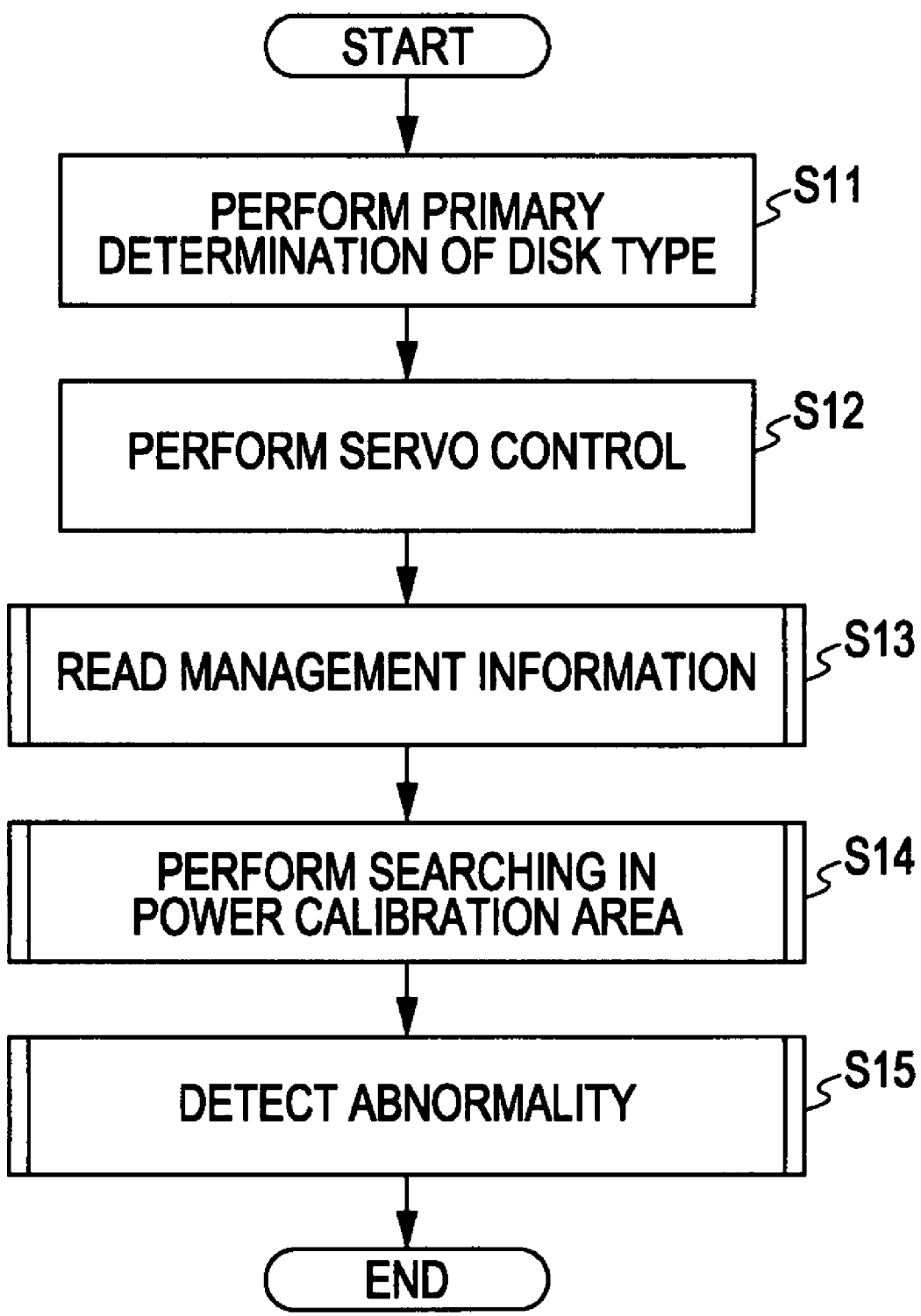
FIG. 5 is a flowchart of an initial operation of the video camera shown in FIG. 1.

An initial operation of the video camera 1 will now be described with reference to a flowchart shown in FIG. 5. This operation starts when a user inserts the optical disk 68 into the optical disk drive 22. In order to identify the optical disk 68, this operation is performed before recording/playback processing for the optical disk 68 inserted in the optical disk drive 22.

When the user inserts the optical disk 68 into the optical disk drive 22, the disk primary determination unit 151 performs primary determination to determine the disk type (format) of the optical disk 68 in step S11.

For example, the disk primary determination unit 151 irradiates the optical disk 68 with light and receives light reflected by the optical disk 68 while moving the objective lens of the optical pickup 64 in directions perpendicular to the information recording plane of the optical disk 68. Accordingly, the disk primary determination unit 151 physically determines the disk type of the optical disk 68 inserted in the optical disk drive 22 in accordance with a focus error signal received from the signal processor 65.

In step S12, the servo control unit 152 performs servo control in accordance with the disk type determined by the disk primary determination unit 151. That is, the servo control unit 152 controls the servo controller 61 to move the objective lens of the optical pickup 64 with respect to the optical disk 68 in vertical directions in FIG. 2 in accordance with the position of the objective lens of the optical pickup 64 and a range of the amplitude of the received focus error signal, correspondingly to the determined disk type. Then, the servo control unit 152 calculates the number of S-shaped curves of the focus error signal received from the signal processor 65 and the amplitude of the focus error signal. In accordance with the calculated values, the servo control unit 152 adjusts the position of the objective lens and the like such that light emitted from the optical pickup 64 is focused on the recording layer of the optical disk 68.

In addition, under the control of the controller 67, the servo control unit 152 drives the sled motor 63 to move the optical pickup 64 and to move the objective lens of the optical pickup 64. In addition, the servo control unit 152 controls the servo controller 61 to perform focus control or tracking control in accordance with a focus error signal or a tracking error signal received from the signal processor 65.

When servo control is completed, the management information reading unit 153 reads management information in step S13. The processing for reading management information will be described later with reference to FIG. 6. In step S13, management information is read from the management area of the optical disk 68, secondary determination as to the disk type of the optical disk 68 is performed, a recording condition of user data is checked, it is determined whether or not management information on the optical disk 68 exists, and a flag indicating the presence or absence of management information on the optical disk 68 is stored in the information memory 155.

In step S14, the calibration area checking unit 154 performs searching in the power calibration area using the function of the signal processor 65 to determine whether or not recording has been performed. The processing for searching in the power calibration area will be described later with reference to FIG. 7. In step S14, a use condition of the power calibration area of the optical disk 68 is checked, it is determined whether or not a usage history of the power calibration area exists, and a flag indicating the presence or absence of a usage history of the power calibration area is stored in the information memory 155.

In step S15, the abnormality detection unit 156 determines whether or not the optical disk 68 is abnormal in accordance with information stored in the information memory 155. The processing for determining whether or not an optical disk abnormality exists will be described later with reference to FIG. 8.

In step S15, it is determined whether or not the optical disk 68 is abnormal in accordance with information stored in the information memory 155, that is, information indicating the presence or absence of management information on the optical disk 68, information indicating the presence or absence of a usage history of the power calibration area, and the like. If it is determined that an optical disk abnormality exists, an abnormality information signal for informing the user that the optical disk 68 is very likely to be abnormal is supplied via the host interface 66 to the data controller 19. When receiving the abnormality information signal supplied from the data controller 19, the system controller 25 causes the output unit 28 or the LCD 16 to inform the user that the optical disk 68 is an abnormal disk and to urge the user to remove the optical disk 68.

In contrast, if it is determined that the optical disk 68 is not abnormal, that is, if the optical disk 68 is normal, the initial operation of the video camera 1 is terminated. Then, in accordance with an instruction signal received from the user to start recording or playback processing, the recording or playback processing is performed. Before the recording processing, the recording power of the laser diode is optimized in an unrecorded portion of the power calibration area in accordance with a use condition of the power calibration area of the optical disk 68 stored in the information memory 155.

Figure 6:
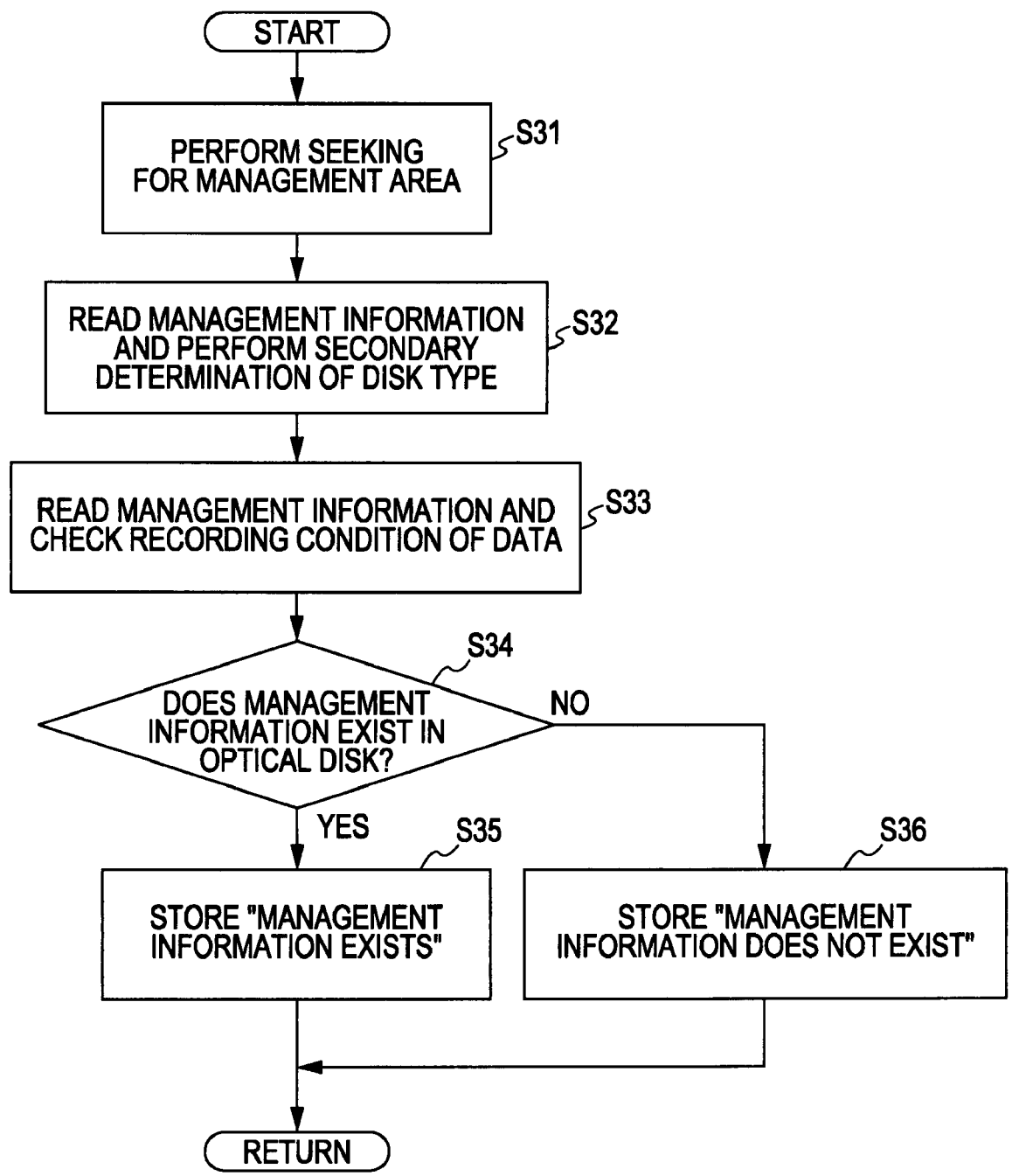
FIG. 6 is a flowchart of processing of step S13 shown in FIG. 5 for reading management information.

The processing of step S13 shown in FIG. 5 for reading management information is described next with reference to a flowchart shown in FIG. 6.

In step S31, the management information reading unit 153 performs a seeking operation for the management area of the optical disk 68. That is, the management information reading unit 153 controls the servo controller 61 and the optical pickup 64 to perform the seek operation for the management area of the optical disk 68.

In step S32, the management information reading unit 153 reads necessary management information from the management area of the optical disk 68, and performs secondary determination as to the disk type of the optical disk 68. That is, the management information reading unit 153 performs secondary determination as to the disk type of the optical disk 68 in accordance with information on the disk type of the optical disk 68 recorded in advance in the identification information portion of the management area, and determines whether the result of the secondary determination is the same as the result of the primary determination as to the disk type performed by the disk primary determination unit 151. If the result of the secondary determination is not the same as the result of the primary determination, the result of the secondary determination of the disk type is adopted. In this case, in accordance with the disk type represented by the result of the secondary determination, serve control is performed again.

In step S33, the management information reading unit 153 reads necessary management information from the management area of the optical disk 68, and checks a recording condition of the data. That is, the management information reading unit 153 checks the recording condition of the data by referring to the 1st to nth management data portions of the management area.

In step S34, the management information reading unit 153 determines whether or not management information exists in the optical disk 68. If data is recorded in the 1st to nth management data portions, the management information reading unit 153 determines in step S34 that management information exists in the optical disk 68. Then, in step S35, the management information reading unit 153 causes the information memory 155 to store a flag indicating that "management information exists". At this time, as part of the management information, information on a use condition of the power calibration area that is used every time data is recorded, a use condition of the data area, and the like is also stored in the information memory 155 where appropriate.

In contrast, if no data is recorded in the 1st to nth management data portions, the management information reading unit 153 determines in step S34 that management information (that is, more specifically, data management information) does not exist in the optical disk 68. Then, in step S36, the management information reading unit 153 causes the information memory 155 to store a flag indicating that "management information does not exist".

After the processing of step S35 or S36, the processing for reading management information is terminated. The process returns to step S13 shown in FIG. 5, and then proceeds to step S14.

Figure 7:
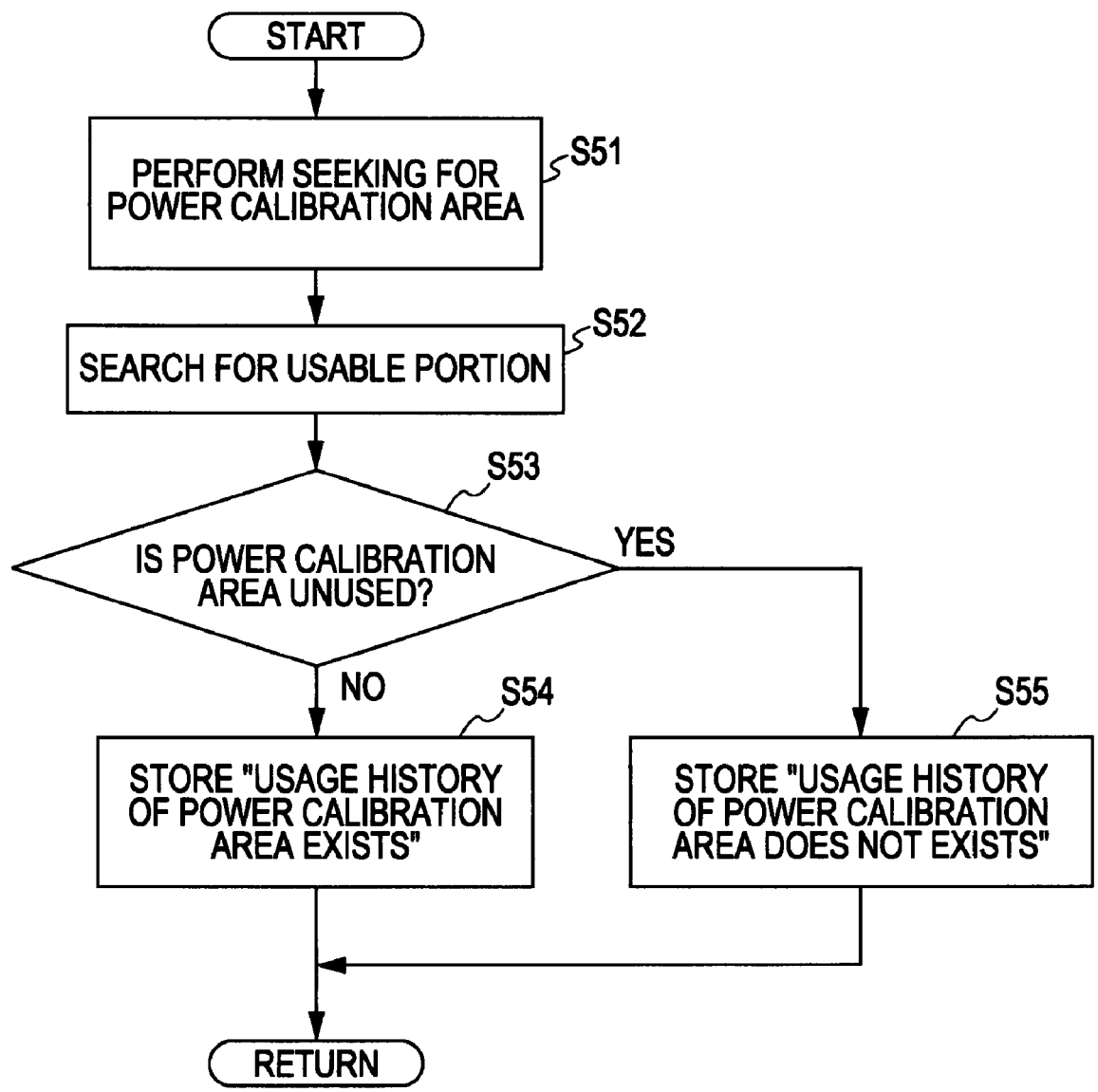
FIG. 7 is a flowchart of processing of step S14 shown in FIG. 5 for performing searching in a power calibration area.

The processing of step S14 shown in FIG. 5 for searching in the power calibration area is described next with reference to a flowchart shown in FIG. 7.

In step S51, the calibration area checking unit 154 performs a seek operation for the power calibration area of the optical disk 68. That is, the calibration area checking unit 154 controls the servo controller 61 and the optical pickup 64 to perform the seek operation for the power calibration area of the optical disk 68.

In step S52, the calibration area checking unit 154 searches for a usable portion of the power calibration area and checks a use condition of the power calibration area by causing the signal processor 65 to determine whether or not recording has been performed in the power calibration area. That is, the signal processor 65 supplies to the controller 67 binary data representing a result of the determination as to whether or not recording has been performed in the power calibration area, and the controller 67 checks the use condition of the power calibration area in accordance with the binary data received from the signal processor 65.

In step S53, the calibration area checking unit 154 determines whether or not the power calibration area is unused. If the calibration area checking unit 154 determines in step S53 that the power calibration area is not unused, the process proceeds to step S54.

In step S54, the calibration area checking unit 154 causes the information memory 155 to store a flag indicating that "a usage history of the power calibration area exists". At this time, information indicating the current use condition of the power calibration area checked in accordance with the binary data (for example, an address indicating a use area) is also stored in the information memory 155.

If the calibration area checking unit 154 determines in step S53 that the power calibration area is unused, the process proceeds to step S55. In step S55, the calibration area checking unit 154 causes the information memory 155 to store a flag indicating that "a usage history of the power calibration area does not exist".

After the processing of step S54 or S55, the processing for searching in the power calibration area is terminated. The process returns to step S14 shown in FIG. 5, and then proceeds to step S15.

The processing of step S15 shown in FIG. 5 for determining whether or not an optical disk abnormality exists is described next with reference to a flowchart shown in FIG. 8.

In step S71, the abnormality detection unit 156 reads the flag that indicates the presence or absence of management information and that is stored in the information memory 155, and determines whether or not management information exists in the optical disk 68 in accordance with the read flag. If the abnormality detection unit 156 determines in step S71 that management information exists in the optical disk 68, the process proceeds to step S72. That is, in this case, since management information exists in the optical disk 68, the abnormality detection unit 156 determines that the optical disk 68 is a "used" disk (that is, a usage history exists in the optical disk 68) in step S72. Then, the processing for determining whether or not an optical disk abnormality exists is terminated.

If the abnormality detection unit 156 determines in step S71 that no management information exists in the optical disk 68, the process proceeds to step S73. In step S73, the abnormality detection unit 156 reads the flag that indicates the presence or absence of a usage history of the power calibration area and that is stored in the information memory 155, and determines whether or not a usage history of the power calibration area of the optical disk 68 exists in accordance with the read flag.

If the abnormality detection unit 156 determines in step S73 that no usage history of the power calibration area of the optical disk 68 exists, the process proceeds to step S74. That is, since neither management information nor usage history of the power calibration area exists in the optical disk 68, the abnormality detection unit 156 determines that the optical disk 68 is an "unused" disk (that is, no usage history exists in the optical disk 68) in step S74. Then, the processing for determining whether or not an optical disk abnormality exists is terminated.

If the abnormality detection unit 156 determines in step S73 that a usage history of the power calibration area of the optical disk 68 exists, the process proceeds to step S75. That is, if no management information exists in the optical disk 68 but a usage history of the power calibration area exists, it is very likely that data has been recorded in the user data area of the optical disk 68. Thus, it is assumed that the optical disk 68 has been used and that management information has failed to be recorded in the optical disk 68 due to some abnormality. Thus, in step S75, the abnormality detection unit 156 determines that the optical disk 68 is an abnormal, disk (that is, an optical disk abnormality exists).

In step S76, the abnormality detection unit 156 informs the system controller 25 via the host interface 66 that the optical disk 68 is "abnormal". That is, the abnormality detection unit 156 generates an abnormality information signal indicating that the optical disk 68 may be abnormal, and supplies the generated abnormality information signal via the host interface 66 to the data controller 19. Then, the abnormality information signal is supplied from the data controller 19 to the system controller 25.

In accordance with the abnormality information signal received from the data controller 19, the system controller 25 controls the output unit 28, which includes the light-emitting element, the acoustic element, and the like, to emit light or sound for informing the user that the optical disk 68 may be abnormal and for urging the user to remove the optical disk 68.

Alternatively, in accordance with the abnormality information signal received from the data controller 19, the system controller 25 reads data that is stored in the screen memory 14 and that is used for displaying a character or drawing (image) of an icon or the like for informing the user that the optical disk 68 may be abnormal and for urging the user to remove the optical disk 68, and performs predetermined calculation in accordance with the read data. Then, the system controller 25 supplies via the video/audio interface 13 to the LCD 16 the obtained image data for displaying the character or drawing (image) of the icon or the like.

Accordingly, light or sound for informing the user that the optical disk 68 may be abnormal is emitted from the output unit 28, which includes the light-emitting element, the acoustic element, and the like. Alternatively, an image for informing the user that the optical disk 68 may be abnormal and for urging the user to remove the optical disk 68 is displayed on the LCD 16.

At this time, not only an image for informing the user that the optical disk 68 may be abnormal and for urging the user to remove the optical disk 68, but an image for informing the user of the optical disk abnormality and a countermeasure against the abnormality can also be displayed. For example, an image for urging the user to bring the optical disk 68 to service may be displayed.

As described above, it is determined whether or not an optical disk abnormality exists not only in accordance with the presence or absence of management information but also in accordance with a usage history of the power calibration area. Thus, for example, an optical disk in which no management information exists but a usage history of the power calibration area exists, that is, an optical disk in which it is very likely that data has been recorded in the user data area and it is assumed that management information has been failed to be recorded due to some abnormality even though the optical disk has been used, is determined to be an "abnormal" disk.

In addition, since the user is informed of the abnormality, the disk in which no management information exists is prevented from being falsely determined to be an unrecorded disk, and which prevents overwriting on previously recorded data, unlike the related art.

Thus, the data previously recorded by the user is prevented from being damaged or lost. Therefore, if the user brings the optical disk, which is determined to be "abnormal", to service, the data previously recorded by the user can be recovered.

In particular, for a write-once optical disk, not only data previously recorded by a user but also data to be recorded is prevented from being damaged. This advantage is significantly effective to a case where data is recorded in a video camera or a digital camera in which recorded data is rarely backed up.

In the above description, an example in which data is recorded on the optical disk 68 by a recording apparatus that performs power calibration immediately before recording processing has been described. However, for example, an apparatus, such as a personal computer, performs power calibration when a disk is inserted, instead of immediately before recording processing. When data is recorded on an optical disk by such an apparatus, even if a usage history of power calibration exists, data may not be recorded. A method for use in such an apparatus for determining whether or not an abnormality exists will be described next.

Figure 9:
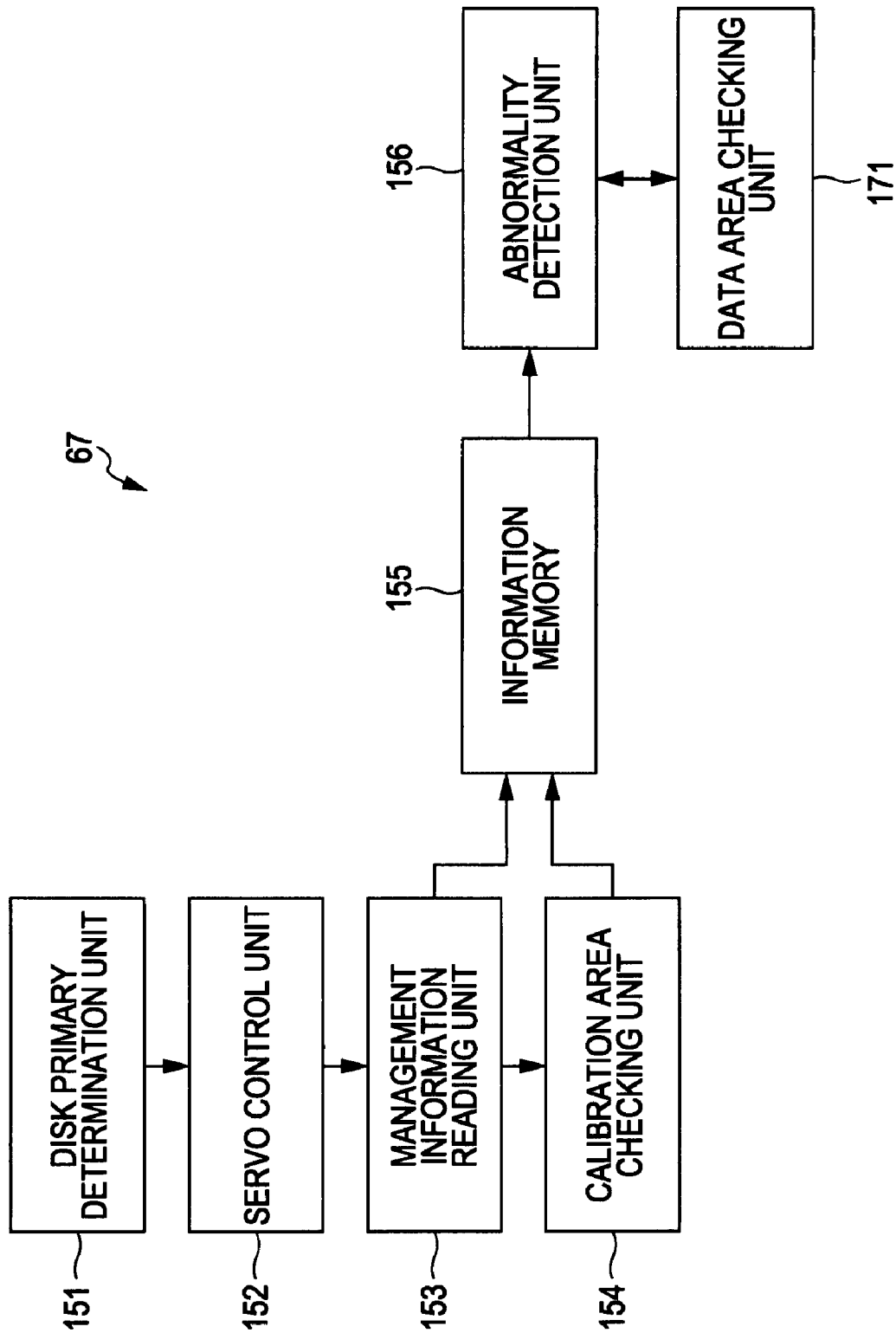
FIG. 9 is a block diagram showing another example of the configuration of functions of the controller shown in FIG. 2.

FIG. 9 is a block diagram showing another configuration of functions of the controller 67. Similarly to the controller 67 shown in FIG. 4, the controller 67 shown in FIG. 9 includes the disk primary determination unit 151, the servo control unit 152, the management information reading unit 153, the calibration area checking unit 154, the information memory 155, and the abnormality detection unit 156. However, the controller 67 shown in FIG. 9 is different from the controller 67 shown in FIG. 4 in that the controller 67 shown in FIG. 9 further includes a data area checking unit 171.

That is, in the example shown in FIG. 9, the abnormality detection unit 156 determines whether or not the optical disk 68 is abnormal not only in accordance with information stored in the information memory 155 but also in accordance with information supplied from the data area checking unit 171, such as a result of determination as to whether or not recording has been performed in the user data area and a use condition of the user data area, where appropriate.

Under the control of the abnormality detection unit 156, the data area checking unit 171 controls the servo controller 61 and the optical pickup 64 to perform a seek operation for the user data area of the optical disk 68, and causes the signal processor 65 to detect whether or not recording has been performed in the user data area. Accordingly, the data area checking unit 171 checks a use condition of the user data area and determines whether or not recording has been performed in the data area. Then, the data area checking unit 171 supplies such information to the abnormality detection unit 156.

Figure 10:
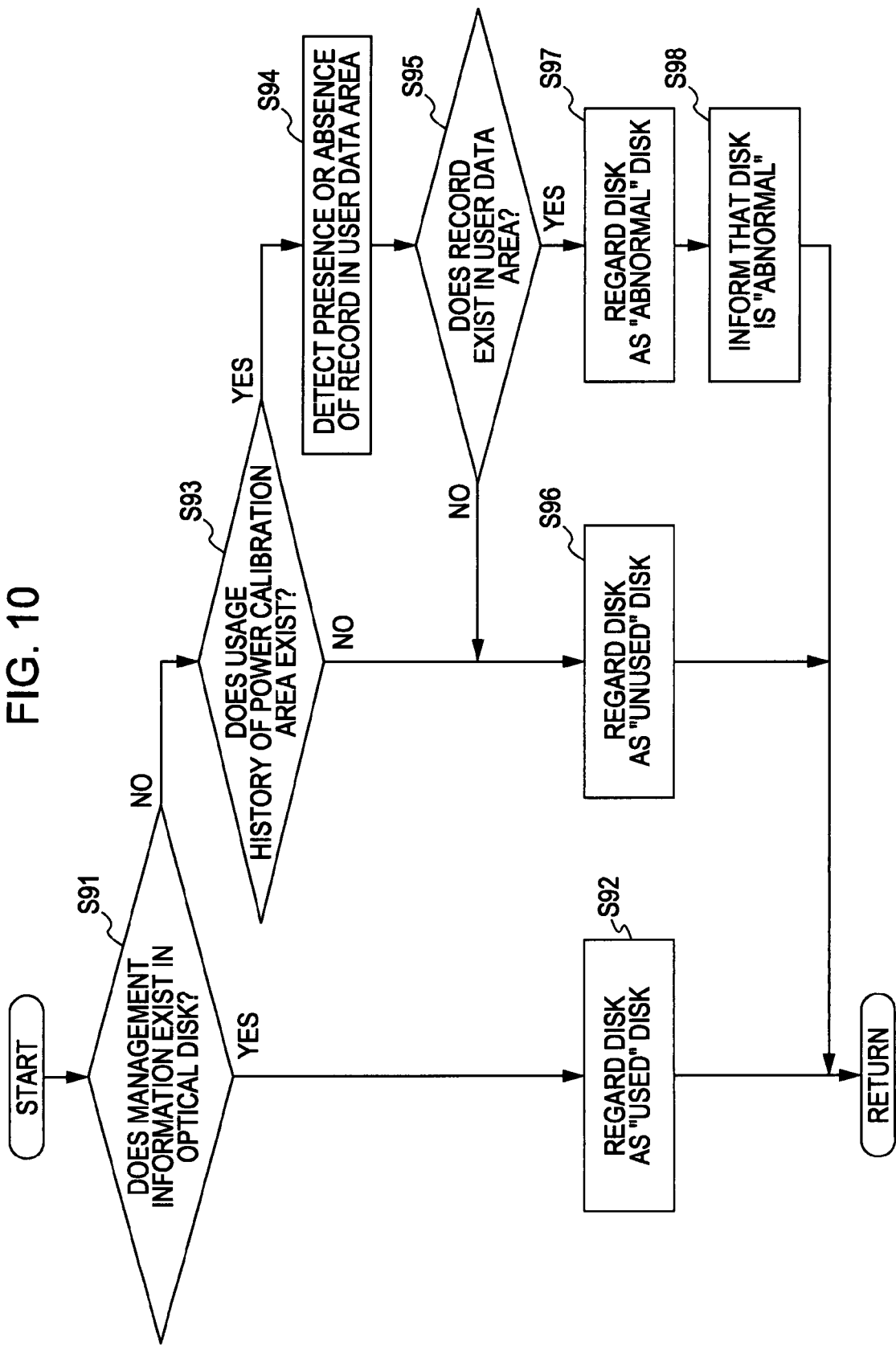
FIG. 10 is a flowchart of another example of the processing of step S15 shown in FIG. 5 for determining whether or not an optical disk abnormality exists.

Another example of the processing of step S15 shown in FIG. 5 performed by the controller 67 shown in FIG. 9 for determining whether or not an optical disk abnormality exists will now be described with reference to a flowchart shown in FIG. 10. Since processing of steps S91 to S93 and processing of steps S96 to S98 shown in FIG. 10 are basically similar to the processing of steps S71 to S76 shown in FIG. 8, descriptions of those similar steps will be omitted in an appropriate manner.

In step S91, the abnormality detection unit 156 reads a flag that is stored in the information memory 155 and that indicates the presence or absence of management information, and determines whether or not management information exists in the optical disk 68 in accordance with the read flag. If the abnormality detection unit 156 determines in step S91 that management information exists in the optical disk 68, the process proceeds to step S92. In step S92, the abnormality detection unit 156 determines that the optical disk 68 is a "used" disk. Then, the processing for determining whether or not an optical disk abnormality exists is terminated.

If the abnormality detection unit 156 determines in step S91 that no management information exists in the optical disk 68, the process proceeds to step S93. In step S93, the abnormality detection unit 156 reads a flag that is stored in the information memory 155 and that indicates the presence or absence of a usage history of the power calibration area, and determines whether or not a usage history of the power calibration area of the optical disk 68 exists in accordance with the read flag. If the abnormality detection unit 156 determines in step S93 that a usage history of the power calibration area of the optical disk 68 exists, the process proceeds to step S94.

In step S94, the abnormality detection unit 156 controls the data area checking unit 171 to detect whether or not recording has been performed in the user data area. That is, under the control of the abnormality detection unit 156, the data area checking unit 171 controls the servo controller 61 and the optical pickup 64 to perform a seek operation for the user data area of the optical disk 68, and causes the signal processor 65 to detect whether or not recording has been performed in the user data area. Accordingly, the signal processor 65 determines whether or not recording has been performed in the data area by checking a use condition of the user data area. Then, the signal processor 65 supplies to the abnormality detection unit 156 information (flag) indicating a result of the determination as to whether or not recording has been performed in the user data area.

Although the entire user data area can be subjected to searching, a portion in which data is likely to be first recorded may be set as a portion of the user data area to be subjected to searching, in terms of efficiency and search speed. For example, for a DVD-R, recording of data is started from a portion of the user data area 106 near the file system information area 105 shown in FIG. 3. Thus, it is determined whether or not data has been recorded in the user data area by performing searching in a portion at the boundary between the user data area 106 and the file system information area 105.

In step S95, the abnormality detection unit 156 determines whether or not recording has been performed in the user data area in accordance with the information that is supplied from the data area checking unit 171 and that indicates whether or not recording has been performed in the user data area. If the abnormality detection unit 156 determines in step S95 that recording has not been performed in the user data area, the process proceeds to step S96.

In addition, if the abnormality detection unit 156 determines in step S93 that no usage history of the power calibration area of the optical disk 68 exists, the process also proceeds to step S96.

That is, when the abnormality detection unit 156 determines in step S93 that no usage history of the power calibration area of the optical disk 68 exists, the optical disk 68 is a disk in which neither management information nor a use history of the power calibration area exists. In addition, when the abnormality detection unit 156 determines in step S95 that recording has not been performed in the user data area, the optical disk 68 is a disk in which no management information exists in the optical disk 68 and no data has been recorded in the user data area even though a usage history of the power calibration area exists in the optical disk 68. Thus, in step S96, the abnormality detection unit 156 determines that the optical disk 68 is an "unused" disk. Then, the processing for determining whether or not an optical disk abnormality exists is terminated.

If the abnormality detection unit 156 determines in step S95 that recording has been performed in the user data area, that is, if no management information exists, a usage history of the power calibration exists, and recording has been performed in the user data area of the optical disk 68, it is very likely that data has been recorded in the user data area of the optical disk 68. Thus, it is assumed that the optical disk 68 has been used and management information has been failed to be recorded due to some abnormality. Then, the process proceeds to step S97. In step S97, the abnormality detection unit 156 determines that the optical disk 68 is an "abnormal" disk.

In step S98, the abnormality detection unit 156 informs the system controller 25 via the host interface 66 that the optical disk 68 is an "abnormal" disk. Thus, the output unit 28, which includes the light-emitting element, the acoustic element, and the like, emits light or sound for informing the user that the optical disk 68 may be abnormal and for urging the user to remove the optical disk 68. Alternatively, an image for informing the user that the optical disk 68 may be abnormal and for urging the user to remove the optical disk 68 is displayed on the LCD 16.

As described above, it is determined whether or not an optical disk abnormality exists in accordance with the determination of whether or not recording has been performed in the user data area as well as in accordance with the determination of whether or not a usage history of the power calibration area exists. Thus, for example, an optical disk in which no management information exists, a usage history of the power calibration area exists, and data has been recorded in the user data area, that is, an optical disk in which it is very likely that data has been recorded in the user data area and it is assumed that management information has been failed to be recorded due to some abnormality even though the optical disk has been used, is determined to be an "abnormal" disk. Thus, detection of an "abnormal" disk can be achieved more reliably compared with the example shown in FIG. 8.

Figure 8:
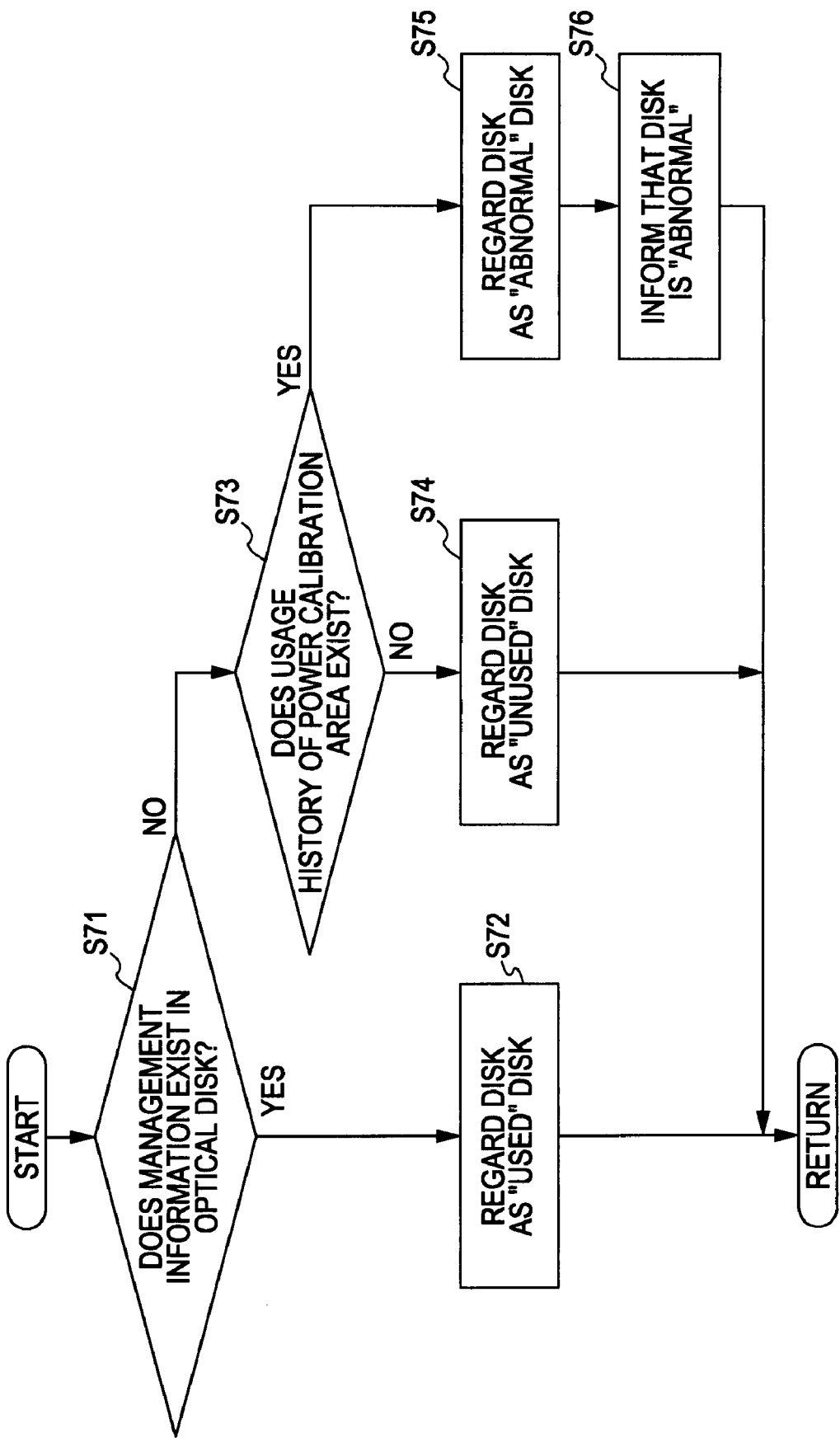
FIG. 8 is a flowchart of processing of step S15 shown in FIG. 5 for determining whether or not an optical disk abnormality exists.

In addition, even for a recording apparatus in which power calibration is performed when a disk is inserted, which is not supported by the example shown in FIG. 8, the disk in which no management information exists is prevented from being falsely determined to be an unrecorded disk, and which prevents overwriting on previously recorded data, unlike the related art.

Figure 11:
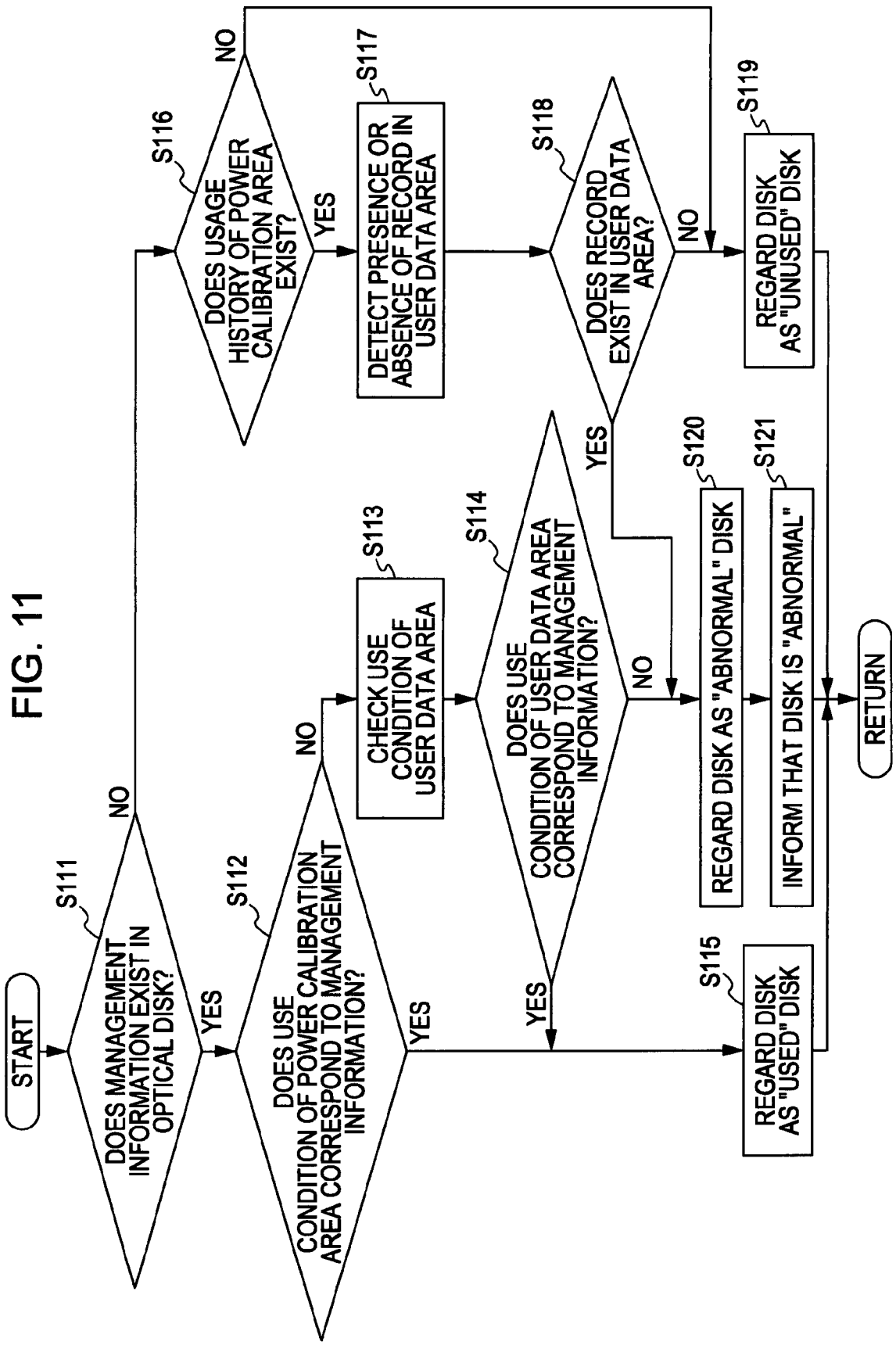
FIG. 11 is a flowchart of another example of the processing of step S15 shown in FIG. 5 for determining whether or not an optical disk abnormality exists.

Another example of the processing of step S15 shown in FIG. 5 for determining whether or not an optical disk abnormality exists is described next with reference to a flowchart shown in FIG. 11. Since processing of step S111 and processing of steps S115 to S121 shown in FIG. 11 are basically similar to the processing of steps S91 to S98 shown in FIG. 9, descriptions of those similar steps will be omitted in an appropriate manner.

In step S111, the abnormality detection unit 156 reads a flag that is stored in the information memory 155 and that indicates the presence or absence of management information, and determines whether or not management information exists in the optical disk 68 in accordance with the read flag. If the abnormality detection unit 156 determines in step S111 that management information exists in the optical disk 68, the process proceeds to step S112. In step S112, the abnormality detection unit 156 reads the current use condition of the power calibration area stored in the information memory 155 and a use condition of the power calibration area in the management information stored in the information memory 155, and determines whether or not the current use condition of the power calibration area corresponds to the management information.

If the abnormality detection unit 156 determines in step S112 that the current use condition of the power calibration area does not correspond to the management information, the process proceeds to step S113. In step S113, the abnormality detection unit 156 controls the data area checking unit 171 to check a use condition of the user data area. That is, under the control of the abnormality detection unit 156, the data area checking unit 171 controls the servo controller 61 and the optical pickup 64 to perform a seek operation for the user data area of the optical disk 68, and causes the signal processor 65 to detect whether or not recording has been performed in the user data area. Accordingly, the data area checking unit 171 checks the use condition of the user data area, and supplies information on the use condition of the user data area to the abnormality detection unit 156.

In step S114, the abnormality detection unit 156 reads information that is stored in the information memory 155 and that indicates a use condition of the data area in the management information recorded in the information memory 155, compares the use condition of the user data area checked by the data area checking unit 171 with the use condition of the data area in the management information, and determines whether or not the use condition of the user data area corresponds to the management information.

If the abnormality detection unit 156 determines in step S114 that the use condition of the user data area corresponds to the management information, the process proceeds to step S115. In addition, if the abnormality detection unit 156 determines in step S112 that the current use condition of the power calibration area corresponds to the management information, the process also proceeds to step S115.

That is, in these cases, since management information exists in the optical disk 68 and the contents described in the management information correspond to the checked use condition of the power calibration area or the checked use condition of the user data area, the abnormality detection unit 156 determines that the optical disk 68 is a "used" disk in step S115. Then, the processing for determining whether or not an optical disk abnormality exists is terminated.

If the abnormality detection unit 156 determines in step S111 that no management information exists in the optical disk 68, the process proceeds to step S116. In step S116, the abnormality detection unit 156 reads a flag that is stored in the information memory 155 and that indicates the presence or absence of a usage history of the power calibration area, and determines whether or not a usage history of the power calibration area of the optical disk 68 exists in accordance with the read flag. If the abnormality detection unit 156 determines in step S116 that a usage history of the power calibration area of the optical disk 68 exists, the process proceeds to step S117.

In step S117, the abnormality detection unit 156 controls the data area checking unit 171 to detect whether or not recording has been performed in the user data area. That is, under the control of the abnormality detection unit 156, the data area checking unit 171 controls the servo controller 61 and the optical pickup 64 to perform a seek operation for the user data area of the optical disk 68, and causes the signal processor 65 to detect whether or not recording has been performed in the user data area. Accordingly, the data area checking unit 171 determines whether or not recording has been performed in the data area, and supplies to the abnormality detection unit 156 information (flag) indicating whether or not recording has been performed in the user data area.

In step S118, the abnormality detection unit 156 determines whether or not recording has been performed in the user data area in accordance with the information that is supplied from the data area checking unit 171 and that indicates whether or not recording has been performed in the user data area. If the abnormality detection unit 156 determines in step S118 that recording has not been performed in the user data area, since no management information exists in the optical disk 68 and no data has been recorded in the user data area even though a usage history of the power calibration area exists in the optical disk 68, the process proceeds to step S119.

If the abnormality detection unit 156 determines in step S116 that no usage history of the power calibration area of the optical disk 68 exists, since neither management information nor usage history of the power calibration area exists in the optical disk 68, the process also proceeds to step S119.

In step S119, the abnormality detection unit 156 determines that the optical disk 68 is an "unused" disk. Then, the processing for determining whether or not an optical disk abnormality exists is terminated.

If the abnormality detection unit 156 determines in step S118 that recording has been performed in the user data area, that is, if no management information exists in the optical disk 68, a usage history of the power calibration area exists, and recording has been performed in the user data area, since it is very likely that data has been recorded in the user data area of the optical disk 68, it is assumed that management information has been failed to be recorded due to some abnormality even though the optical disk 68 has been used. Thus, the process proceeds to step S120.

In contrast, if the abnormality detection unit 156 determines in step S114 that the use condition of the user data area does not correspond to the management information, that is, if the size of the actually used user data area checked by the data area checking unit 171 is larger than that indicated by the use condition of the user data area described in the management information, it is assumed that management information when the latest data is recorded in the optical disk 68 is failed to be recorded due to some abnormality. Thus, the process proceeds to step S120.

In step S120, the abnormality detection unit 156 determines that the optical disk 68 is an "abnormal" disk.

In step S121, the abnormality detection unit 156 informs the system controller 25 via the host interface 66 that the optical disk 68 is an abnormal disk. Thus, the output unit 28, which includes the light-emitting element, the acoustic element, and the like, emits light or sound for informing the user that the optical disk 68 may be abnormal and for urging the user to remove the optical disk 68. Alternatively, an image for informing the user that the optical disk 68 may be abnormal and for urging the user to remove the optical disk 68 is displayed on the LCD 16.

As described above, when management information exists, it is determined whether or not an optical disk abnormality exists in accordance with a use condition of the power calibration area and a use condition of the user data area described in the management information. Thus, for example, even if management information exists in a disk (that is, at least one usage history exists), it can be determined that the disk is abnormal, and the user can be informed of the abnormality.

In addition, it is determined whether or not an optical disk abnormality exists not only in accordance with a use condition of the power calibration area described in the management information but also in accordance with a use condition of the user data area described in the management information. Thus, for example, even if information on a use condition of the power calibration area of an optical disk is not described in management information, it can be determined that the optical disk is abnormal.

Thus, data previously recorded by the user and data to be recorded can be prevented from being damaged or lost. Therefore, for example, if the user brings the optical disk, which is determined to be "abnormal", to service, the data previously recorded by the user can be recovered.

In the above descriptions, an example in which it is determined that a disk is abnormal and the user is informed of the abnormality has been described. However, since the optical disk drive 22 is capable of determining whether or not a disk abnormality exists, the optical disk drive 22 may be provided with a function to correct the detected abnormality and to recover data previously recorded by the user even if no management information exists.

As described above, according to an embodiment of the present invention, when a disk is inserted, identification of the disk is performed using not only management information but also information indicating a usage history of the power calibration area. Thus, a disk in which data has been recorded but management information has been failed to be recorded can be prevented from being identified as an unused disk. That is, a disk in which data has been recorded but management information has been failed to be recorded can be detected as an abnormal disk. Thus, the user can be informed of the detected abnormality, and the abnormality can be corrected.

Thus, data previously recorded by the user and data to be recorded can be prevented from being damaged or lost.

The foregoing series of processing may be performed by hardware or software.

If the foregoing series of processing is performed by software, a program constituting the software is installed from a program recording medium on a computer installed in dedicated hardware or, for example, a general-purpose personal computer capable of performing various functions by installing various programs.

Figure 12:
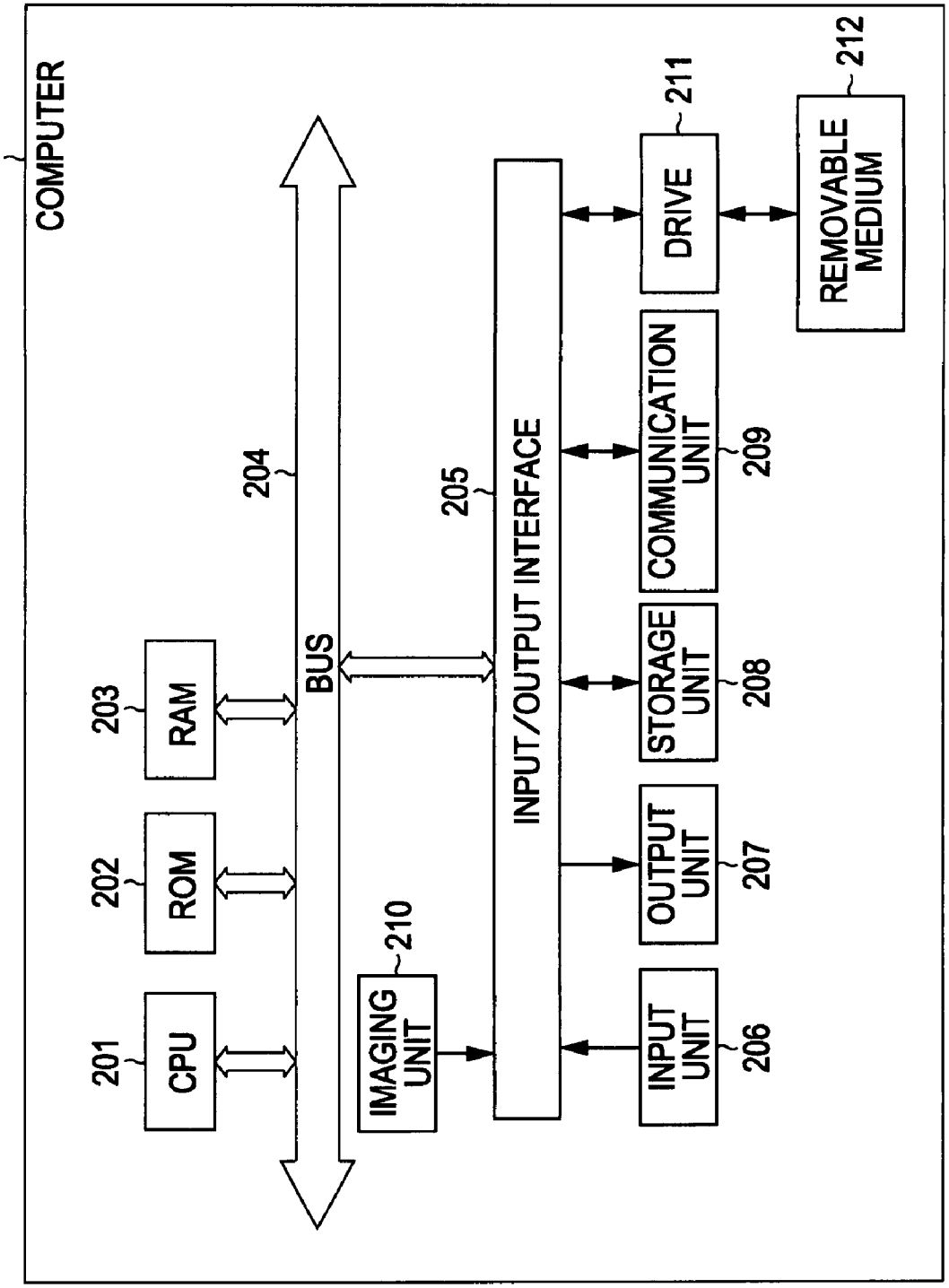
FIG. 12 is a block diagram showing an example of the configuration of a computer according to an embodiment of the present invention.

FIG. 12 is a block diagram showing an example of the configuration of a computer 191 that executes the above-described series of processing stored in a program. A central processing unit (CPU) 201 executes various types of processing in accordance with a program stored in a read-only memory (ROM) 202 or a storage unit 208. A program, data, and the like to be executed by the CPU 201 are stored in a random-access memory (RAM) 203 in an appropriate manner. The CPU 201, the ROM 202, and the RAM 203 are connected to each other with a bus 204 therebetween.

An input/output interface 205 is connected to the CPU 201 with the bus 204 therebetween. An input unit 206 including a keyboard, a mouse, a microphone, and the like and an output unit 207 including a display, a speaker, and the like are connected to the input/output interface 205. The CPU 201 executes various types of processing in accordance with an instruction input via the input unit 206. Then, the CPU 201 outputs a processed result to the output unit 207.

The storage unit 208 that is connected to the input/output interface 205 includes, for example, a hard disk. A program to be executed by the CPU 201 and various data are stored in the storage unit 208. A communication unit 209 communicates with an external apparatus via a network, such as the Internet or a local area network. A program acquired via the communication unit 209 may be stored in the storage unit 208.

An imaging unit 210 corresponds to the imaging unit 11 and the like shown in FIG. 1. The imaging unit 210 captures an image of a subject and acquires image data.

A drive 211 connected to the input/output interface 205 corresponds to the optical disk drive 22 shown in FIG. 1. When a removable medium 212, such as a magnetic disk, an optical disk, a magneto-optical disk, or a semiconductor memory, is mounted in the drive 211, the drive 211 drives the removable medium 212 and acquires a program or data recorded in the removable medium 212. The acquired program or data is transferred to the storage unit 208 where appropriate, and stored in the storage unit 208.

The program storage medium that is installed on the computer and that stores a program executable by the computer includes, for example, the removable medium 212, which is a package medium, such as a magnetic disk (e.g., a flexible disk), an optical disk (e.g., compact disc read-only memory (CD-ROM) or a DVD), a magneto-optical disk, or a semiconductor memory, the ROM 202 in which a program is temporarily or permanently stored, and the hard disk forming the storage unit 208, as shown in FIG. 12. A program is stored into the program storage medium using a wired or wireless communication medium, such as a local area network, the Internet, or digital satellite broadcasting, via the communication unit 209, which is an interface, such as a router or a modem, where appropriate.

In this specification, steps defining a program stored in the program storage medium are not necessarily performed in chronological order in accordance with the written order. The steps may be performed in parallel or independently without being performed in chronological order.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus recording data on an optical disk, comprising:
   management information checking means for determining whether or not management information on the optical disk for managing the data recorded on the optical disk exists by checking for management information on the optical disk when the optical disk is inserted in the recording apparatus;
   area usage checking means for determining whether or not a usage history of an optical disk area for optimizing recording power exists by checking a use condition of the optical disk area for optimizing recording power; and
   abnormality detecting means for determining whether or not an optical disk abnormality exists in accordance with the presence or absence of management information on the optical disk and the presence or absence of a usage history of the optical disk area for optimizing recording power.

2. The recording apparatus according to claim 1, wherein, when no management information on the optical disk exists and a usage history of the optical disk area for optimizing recording power exists, the abnormality detecting means determines that an optical disk abnormality exists.

3. The recording apparatus according to claim 1, further comprising:
   storing means for storing information indicating the presence or absence of management information on the optical disk, information indicating the presence or absence of a usage history of the optical disk area for optimizing recording power, and information indicating the use condition of the optical disk area for optimizing recording power.

4. The recording apparatus according to claim 1, wherein, when management information on the optical disk exists, the abnormality detecting means determines whether or not an optical disk abnormality exists in accordance with determination of whether or not a use condition of the optical disk area for optimizing recording power described in the management information on the optical disk is the same as the use condition of the optical disk area for optimizing recording power checked by the area usage checking means.

5. The recording apparatus according to claim 1, further comprising:
- data area checking means for determining whether or not a data recording area of the optical disk has been used by checking a use condition of the data recording area of the optical disk,
- wherein the abnormality detecting means determines whether or not an optical disk abnormality exists not only in accordance with the presence or absence of management information on the optical disk and the presence or absence of a usage history of the optical disk area for optimizing recording power but also in accordance with a result of the determination of whether or not the data recording area of the optical disk has been used.

6. The recording apparatus according to claim 5, wherein, when management information on the optical disk exists, the abnormality detecting means determines whether or not an optical disk abnormality exists in accordance with determination of whether or not a use condition of the data recording area described in the management information on the optical disk is the same as the use condition of the data recording area of the optical disk checked by the data area checking means.

7. The recording apparatus according to claim 1, further comprising:
- informing means for informing a user of an optical disk abnormality in the case that the abnormality detecting means determines that an optical disk abnormality exists.

8. An abnormality detection method for use in a recording apparatus recording data on an optical disk, comprising the steps of:
- determining whether or not management information on the optical disk for managing the data recorded on the optical disk exists by checking for management information on the optical disk when the optical disk is inserted in the recording apparatus;
- determining whether or not a usage history of an optical disk area for optimizing recording power exists by checking a use condition of the optical disk area for optimizing recording power; and
- determining whether or not an optical disk abnormality exists in accordance with the presence or absence of management information on the optical disk and the presence or absence of a usage history of the optical disk area for optimizing recording power.

9. A non-transitory computer readable medium having stored thereon a program for causing a recording apparatus recording data on an optical disk to execute processing comprising the steps of:
- determining whether or not management information on the optical disk for managing the data recorded on the optical disk exists by checking for management information on the optical disk when the optical disk is inserted in the recording apparatus;
- determining whether or not a usage history of an optical disk area for optimizing recording power exists by checking a use condition of the optical disk area for optimizing recording power; and
- determining whether or not an optical disk abnormality exists in accordance with the presence or absence of management information on the optical disk and the presence or absence of a usage history of the optical disk area for optimizing recording power.

10. A recording apparatus recording data on an optical disk, comprising:
- a management information checking unit that determines whether or not management information on the optical disk for managing the data recorded on the optical disk exists by checking for management information on the optical disk when the optical disk is inserted in the recording apparatus;
- an area usage checking unit that determines whether or not a usage history of an optical disk area for optimizing recording power exists by checking a use condition of the optical disk area for optimizing recording power; and
- an abnormality detection unit that determines whether or not an optical disk abnormality exists in accordance with the presence or absence of management information on the optical disk and the presence or absence of a usage history of the optical disk area for optimizing recording power.

* * * * *